(12) United States Patent
Huang et al.

(10) Patent No.: US 10,112,867 B2
(45) Date of Patent: *Oct. 30, 2018

(54) CHEMICALLY STRENGTHENED GLASS AND METHODS OF MAKING SAME

(71) Applicant: International Business Machines Corporation, Armonk, NY (US)

(72) Inventors: Qiang Huang, Croton-on-Hudson, NY (US); Kenneth P. Rodbell, Sandy Hook, CT (US); Asli Sahin, Purdys, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/429,994

(22) Filed: Feb. 10, 2017

(65) Prior Publication Data
US 2017/0204004 A1   Jul. 20, 2017

Related U.S. Application Data

(63) Continuation of application No. 15/002,391, filed on Jan. 20, 2016, now Pat. No. 9,718,728, which is a continuation of application No. 15/002,359, filed on Jan. 20, 2016, now Pat. No. 9,890,075.

(51) Int. Cl.
  *C03C 21/00* (2006.01)
  *C03C 3/00* (2006.01)

(52) U.S. Cl.
  CPC ........... *C03C 21/002* (2013.01); *C03C 3/00* (2013.01)

(58) Field of Classification Search
  CPC .... C03C 21/00; C03C 21/001; C03C 221/002
  See application file for complete search history.

(56) References Cited

U.S. PATENT DOCUMENTS

| | | | |
|---|---|---|---|
| 2,779,136 A | 1/1957 | Hood et al. | |
| 3,357,876 A | 12/1967 | Rinehart | |
| 3,433,611 A | 3/1969 | Saunders et al. | |
| 3,573,072 A * | 3/1971 | Duke et al. | C03B 23/08 501/6 |
| 3,674,454 A | 7/1972 | Plumat et al. | |
| 3,807,980 A * | 4/1974 | Boffe | C03C 21/00 65/30.14 |
| 4,766,954 A * | 8/1988 | Bierlein | C30B 33/00 427/164 |
| 4,872,896 A * | 10/1989 | LaCourse | C03C 21/002 65/30.14 |
| 4,913,717 A * | 4/1990 | Cooper | C03C 21/003 65/111 |
| 6,050,870 A | 4/2000 | Suginoya et al. | |
| 6,134,918 A * | 10/2000 | Eto | C03C 21/002 65/30.14 |
| 9,718,728 B1 * | 8/2017 | Huang | C03C 3/00 |
| 2011/0293942 A1 * | 12/2011 | Cornejo | C03C 3/083 428/410 |
| 2012/0052271 A1 | 3/2012 | Gomez | |
| 2014/0099501 A1 | 4/2014 | Yamamoto | |
| 2014/0154440 A1 | 6/2014 | Iida et al. | |
| 2014/0178663 A1 | 6/2014 | Varshneya et al. | |
| 2014/0178691 A1 | 6/2014 | Kreski | |

FOREIGN PATENT DOCUMENTS

| | | |
|---|---|---|
| GB | 917388 A | 2/1963 |
| GB | 966735 A | 8/1964 |
| GB | 1071351 A | 6/1967 |
| GB | 1228432 A | 4/1971 |
| JP | S61-097147 A | 5/1986 |
| JP | S62-275044 A | 11/1987 |

OTHER PUBLICATIONS

S.S. Kistler, "Stresses in Glass Produced by Nonuniform Exchange of Monovalent Ions," Journal of the American Ceramic Society, Feb. 1962, v.45, n.2, pp. 59-68.
G.J. Janz et al., "Molten Salts: vol. 4, Part 2, Chlorides and Mixtures," Journal of Physical and Chemical Reference Data, 1975, v.4, n.4, pp. 871-1178.
Facility for the Analysis of Chemical Thermodynamics, "FTsalt—FACT Salt Phase Diagrams (284)," http://www.crct.polymtl.ca/fact/documentation/FTsalt/FTsalt_Figs.htm, 2015, 2 pages.
F. Berkemeier et al., "Molar volume, glass-transition temperature, and ionic conductivity of Na- and Rb-borate glasses in comparison with mixed Na—Rb borate glasses," Journal of Non-Crystalline Solids, Dec. 2005, v.351, pp.3816-3825.
J. Schoo et al., "Tracer diffusion in sodium-rubidium borate glasses: An unconventional mixed-alkali effect?," Solid State Ionics, Dec. 2000, v.138, pp. 105-114.

* cited by examiner

*Primary Examiner* — Elizabeth A. Bolden
(74) *Attorney, Agent, or Firm* — L. Jeffrey Kelly, Esq.; Hoffmann & Baron, LLP

(57) ABSTRACT

In one aspect, a method for use in preparing a glass comprises: performing a first ion exchange process to replace at least a first ion in the glass with at least a second ion, the second ion being smaller than the first ion; and performing a second ion exchange process to replace at least the second ion in the glass with at least a third ion, the third ion being larger than the first ion. In another aspect, a glass is prepared at least in part by: performing a first ion exchange process to replace at least a first ion in the glass with at least a second ion, the second ion being smaller than the first ion; and performing a second ion exchange process to replace at least the second ion in the glass with at least a third ion, the third ion being larger than the first ion.

10 Claims, 23 Drawing Sheets

CHEMICALLY STRENGTHENED GLASS AND METHODS OF MAKING SAME

CROSS-REFERENCE TO RELATED APPLICATION(S)

The present application is a continuation of U.S. patent application Ser. No. 15/002,391, filed Jan. 20, 2016, which is a continuation of U.S. patent application Ser. No. 15/002,359, filed Jan. 20, 2016, each having the same title and inventors as the present application, the disclosures of which are hereby incorporated by reference herein in their entireties for all purposes.

BACKGROUND OF THE INVENTION

The present invention relates generally to the chemical arts, and, more particularly, to chemically strengthened glass and a method for its manufacture.

Chemically strengthened glasses have been used widely in mobile devices. Typically, a glass, such as aluminosilicate glass, is treated at high temperature in molten potassium (K) salt, such as potassium nitrate ($KNO_3$). The sodium (Na) ions in the surface layer of the glass are replaced by potassium ions.

Because potassium ions are of larger size than sodium ions, a compressive stress is created in the surface of the glass. The central portion of the glass is under tensile stress. The compressive surface increases the hardness of the glass and prevents scratches and breakage of the glass. However, if the tensile stress in the glass is above a threshold value, a small fracture in the tensile region will trigger the fracturing in the tensile region. If the surrounding compressive layer is thin, the fracture in the tensile region will penetrate the compressive layer and shatter the whole glass.

In certain applications, finer fracturing or finer shattering particles are needed, which requires a higher tensile stress in the center of the glass. However, a higher tensile stress in the glass requires a thicker compressive layer for a constant glass thickness. This thicker compressive layer will prevent the fracturing in the tensile region from penetrating through and shattering the whole glass.

However, while a thicker compressive layer will advantageously increase the resistance of glass to scratches or surface damages, it will also undesirably increase the thickness and weight of glass. Therefore, there is a long-felt but unmet need for a technique for glass which provides greater compressive strength without increasing the compressive layer thickness.

BRIEF SUMMARY

In one aspect, a method for use in preparing a glass comprises: performing a first ion exchange process to replace at least a first ion in the glass with at least a second ion, the second ion being smaller than the first ion; and performing a second ion exchange process to replace at least the second ion in the glass with at least a third ion, the third ion being larger than the first ion. In another aspect, a glass is prepared at least in part by: performing a first ion exchange process to replace at least a first ion in the glass with at least a second ion, the second ion being smaller than the first ion; and performing a second ion exchange process to replace at least the second ion in the glass with at least a third ion, the third ion being larger than the first ion.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views.

FIG. 1A shows a phase diagram for a eutectic mixture of rubidium bromide (RbBr) and rubidium fluoride (RbF);

FIG. 1B shows a phase diagram for a eutectic mixture of rubidium chloride (RbCl) and rubidium fluoride (RbF); and FIG. 1C shows a phase diagram for a eutectic mixture of rubidium chloride (RbCl) and rubidium iodide (RbI).

FIG. 2A shows a phase diagram for a eutectic mixture of rubidium chloride (RbCl) and lithium chloride (LiCl);

FIG. 2B shows a phase diagram for a eutectic mixture of rubidium chloride (RbCl) and sodium chloride (NaCl);

FIG. 2C shows a phase diagram for a eutectic mixture of rubidium bromide (RbBr) and lithium bromide (LiBr);

FIG. 2D shows a phase diagram for a eutectic mixture of rubidium bromide (RbBr) and sodium bromide (NaBr);

FIG. 2E shows a phase diagram for a eutectic mixture of rubidium iodide (RbI) and lithium iodide (LiI); and FIG. 2F shows a phase diagram for a eutectic mixture of rubidium iodide (RbI) and sodium iodide (NaI).

FIG. 3A shows a phase diagram for a eutectic mixture of rubidium chloride (RbCl) and magnesium chloride ($MgCl_2$);

FIG. 3B shows a phase diagram for a eutectic mixture of rubidium chloride (RbCl) and calcium chloride ($CaCl_2$);

FIG. 3C shows a phase diagram for a eutectic mixture of rubidium chloride (RbCl) and strontium chloride ($SrCl_2$); and FIG. 3D shows a phase diagram for a eutectic mixture of rubidium chloride (RbCl) and barium chloride ($BaCl_2$).

FIG. 4A shows a phase diagram for a eutectic mixture of rubidium chloride (RbCl) and cadmium chloride ($CdCl_2$);

FIG. 4B shows a phase diagram for a eutectic mixture of rubidium chloride (RbCl) and lead chloride ($PbCl_2$);

FIG. 4C shows a phase diagram for a eutectic mixture of rubidium chloride (RbCl) and scandium chloride ($ScCl_3$);

FIG. 4D shows a phase diagram for a eutectic mixture of rubidium chloride (RbCl) and uranium tetrachloride ($UCl_4$); and FIG. 4E shows a phase diagram for a eutectic mixture of rubidium chloride (RbCl) and zinc chloride ($ZnCl_2$).

FIG. 6A shows a phase diagram for a eutectic mixture of lithium nitrate (LiNO₃) and lithium chloride (LiCl); and FIG. 6B shows a phase diagram for a eutectic mixture of lithium nitrate (LiNO₃) and lithium fluoride (LiF).

FIG. 7A shows a phase diagram for a eutectic mixture of potassium nitrate (KNO₃) and potassium chloride (KCl); and FIG. 7B shows a phase diagram for a eutectic mixture of potassium nitrate (KNO₃) and potassium fluoride (KF).

Figure 1A:
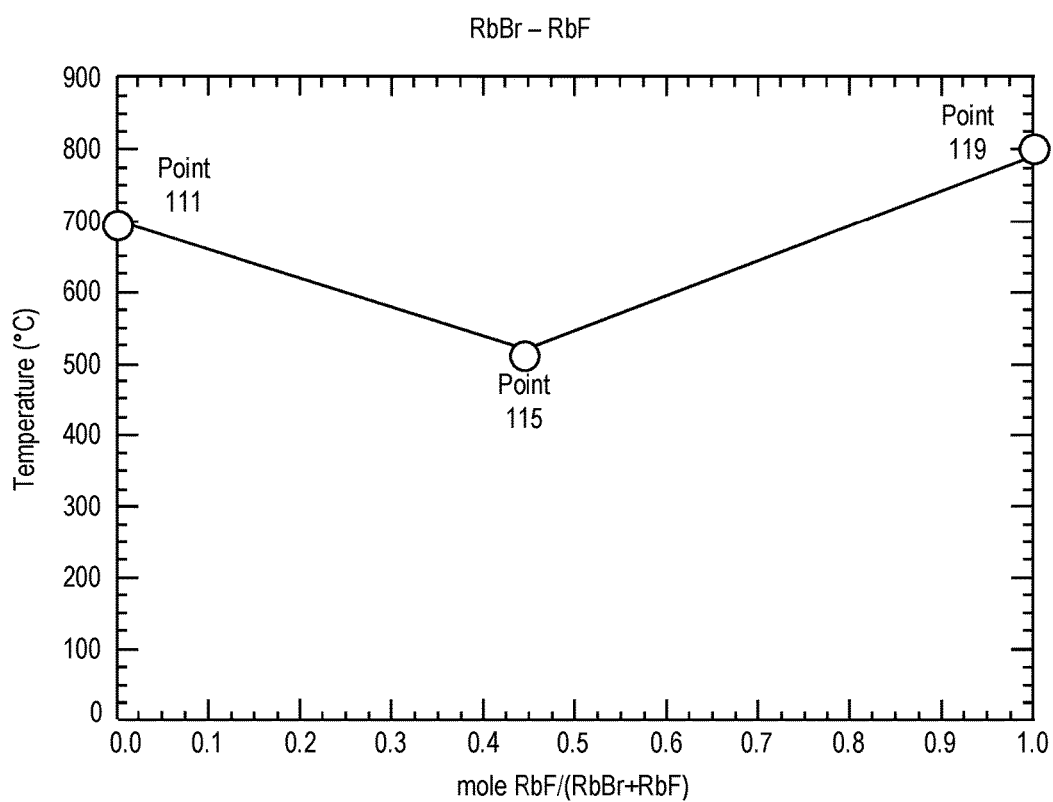
FIGS. 1A-1C show phase diagrams for exemplary eutectic mixtures of rubidium halides suitable for use with embodiments of the present invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

It is to be appreciated that the invention is not limited to the specific apparatus and/or methods illustratively shown and described herein. Moreover, it will become apparent to those skilled in the art given the teachings herein that numerous modifications can be made to the embodiments shown that are within the scope of the claimed invention. Thus, no limitations with respect to the embodiments shown and described herein are intended or should be inferred.

As previously noted, conventional techniques for strengthening glass involve substituting sodium (Na) ions with larger potassium (K) ions. Like sodium and potassium, rubidium (Rb) is an alkali metal found in Group I of the periodic table. However, rubidium is larger than potassium, which as noted above is larger than sodium. Thus, treating glass with rubidium salts will produce an even greater size expansion and a correspondingly greater increase in compressive stress tolerance than conventional treatment with potassium salts, without increased thickness.

Unfortunately, rubidium salts are often ill-suited for use as a glass treatment. It is important to note that rubidium requires higher temperatures for ion exchange than sodium or potassium. Rubidium diffusion often necessitates processing at a temperature of over 450° C. Experiments have shown that 98 hours of processing at 400° C. will produce almost no observable diffusion of rubidium, even though similar conditions will result in almost complete diffusion of sodium and substantial diffusion of potassium.

However, many rubidium salts melt at temperatures well below those required for rubidium diffusion. By way of example, rubidium nitrate (RbNO₃) has a melting point of 310° C., and rubidium hydroxide (RbOH) has a melting point of 301° C. Attempting to use many rubidium salts, such as rubidium nitrate, for processing glass at these high temperatures (e.g., greater than 400° C. or even 450° C.) would result in evaporation and decomposition of the salt rather than ion exchange.

Conversely, other rubidium salts cannot be used in glass treatment because their melting points are close to or above the glass transition temperature of most glasses, including aluminosilicate glass. For example, rubidium halides are compounds of rubidium (Rb) with halogens found in Group 17 of the periodic table, such as fluorine (F), chlorine (Cl), bromine (Br), and iodine (I). Rubidium halides often have high melting points of approximately 600-700° C. For example, rubidium fluoride (RbF) has a melting point of 795° C., rubidium chloride (RbCl) has a melting point of 718° C., rubidium bromide (RbBr) has a melting point of 693° C., and rubidium iodide (RbI) has a melting point of 647° C. Most glass would be deformed and could even melt if exposed to processing temperatures as high as 600-700° C. Thus, conventional rubidium halides are unsuitable for use in glass processing due to their high melting points.

Thus, none of the rubidium salts commonly found in nature are compatible with the temperatures for ion exchange processing of glass; none has a melting point between 450° C. to 600° C. The named inventors have found that this problem can be solved by using a eutectic mixture including at least one rubidium salt. As known to one skilled in the art, the melting point of a eutectic mixture varies within a range for different relative proportions of the constituent compounds, as shown on the phase diagram for a given mixture. The lowest possible melting point for a eutectic mixture is called a eutectic temperature, and is often for a specific eutectic composition (i.e., a particular proportion of the components of the eutectic mixture); the combination of a eutectic temperature and a eutectic composition defines a eutectic point on a phase diagram.

Thus, some embodiments of the present invention may use a eutectic mixture of a first salt and a second salt. In some embodiments, at least the first salt is a rubidium (Rb) salt. In some embodiments, the first and second salts have the same anion, but with different cations. For example, the first and second salts may be different salts of rubidium. More particularly, some embodiments of the present invention involve using a eutectic mixture of a first rubidium salt with a melting point too high for glass treatment (e.g., a melting point above approximately 600 to 700° C.) with a second rubidium salt having a melting point too low for glass treatment (e.g., a melting point below approximately 400° C. to 450° C.). The first rubidium salt may be a rubidium halide, such as rubidium bromide (RbBr) or rubidium chloride (RbCl), while the second rubidium salt may be, for example, rubidium nitrate (RbNO₃) or rubidium hydroxide (RbOH).

For example, as noted above, pure rubidium nitrate (RbNO₃) has a melting point of 310° C., which is lower than optimal temperatures for rubidium ion exchange, while pure rubidium bromide (RbBr) has a melting point of 693° C., which is higher than optimal temperatures for glass processing. However, the melting point of a eutectic mixture of rubidium bromide (RbBr) and rubidium nitrate (RbNO₃) can be set to any temperature between 310° C. and 693° C. simply by adjusting the relative proportions of the constituent compounds: a mixture with a higher proportion of RbBr will have a higher melting point, while a mixture with a higher proportion of RbNO₃ will have a lower melting point. Thus, a eutectic mixture of RbBr and RbNO₃ can be selected and prepared so as to have a melting point within the optimal range of between 450° C. and 600° C. Similar results can be obtained by using eutectic mixtures of rubidium nitrate (RbNO₃) with other rubidium halides, such as rubidium chloride (RbCl), which has a melting point of 718° C. Alternatively, a eutectic mixture of rubidium hydroxide, which has a melting point of 301° C., and a rubidium halide could be used.

In many instances, a eutectic mixture can have a melting point which is lower than either of its constituent components. Thus, embodiments of the present invention may involve the use of a eutectic mixture of a first salt and a second salt, in which each salt individually has a melting point too high for glass treatment (e.g., a melting point approaching or above approximately 600-700° C.), but the eutectic mixture has a eutectic temperature (e.g., a melting point for a specific proportion of components) which is lower than its constituent components, such that the eutectic mixture can be selected and prepared so as to have a melting point within the optimal range of between 450° C. and 600° C.

Figure 1B:
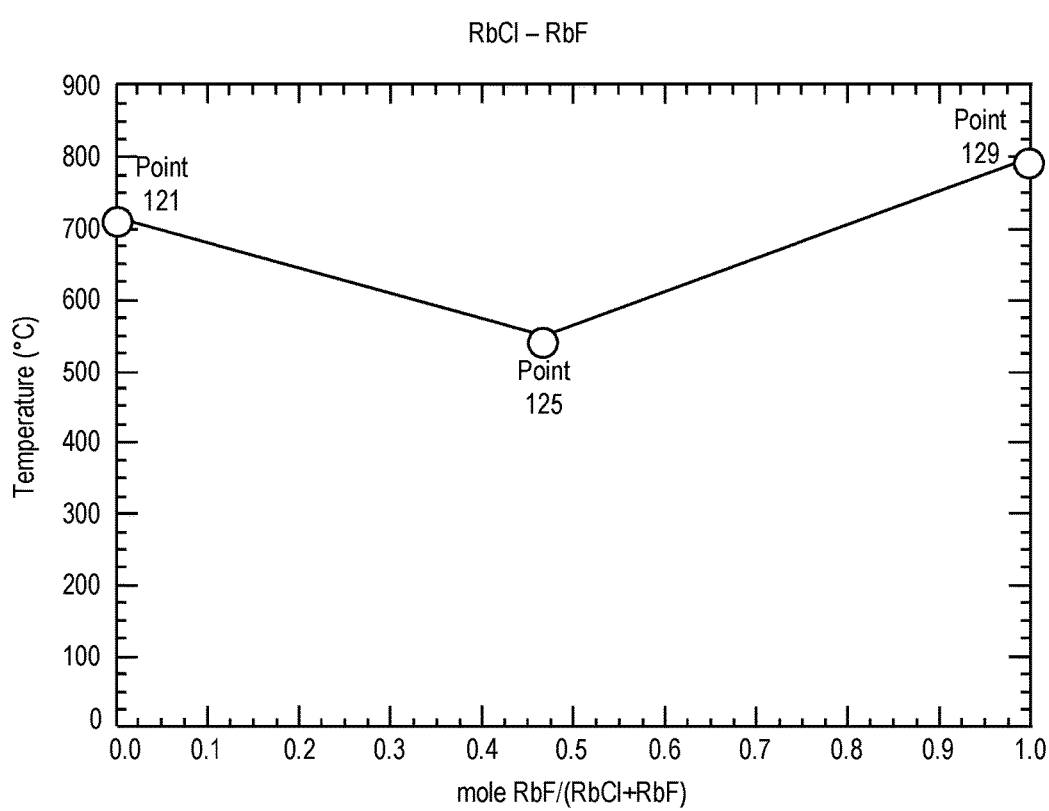
Figure 1C:
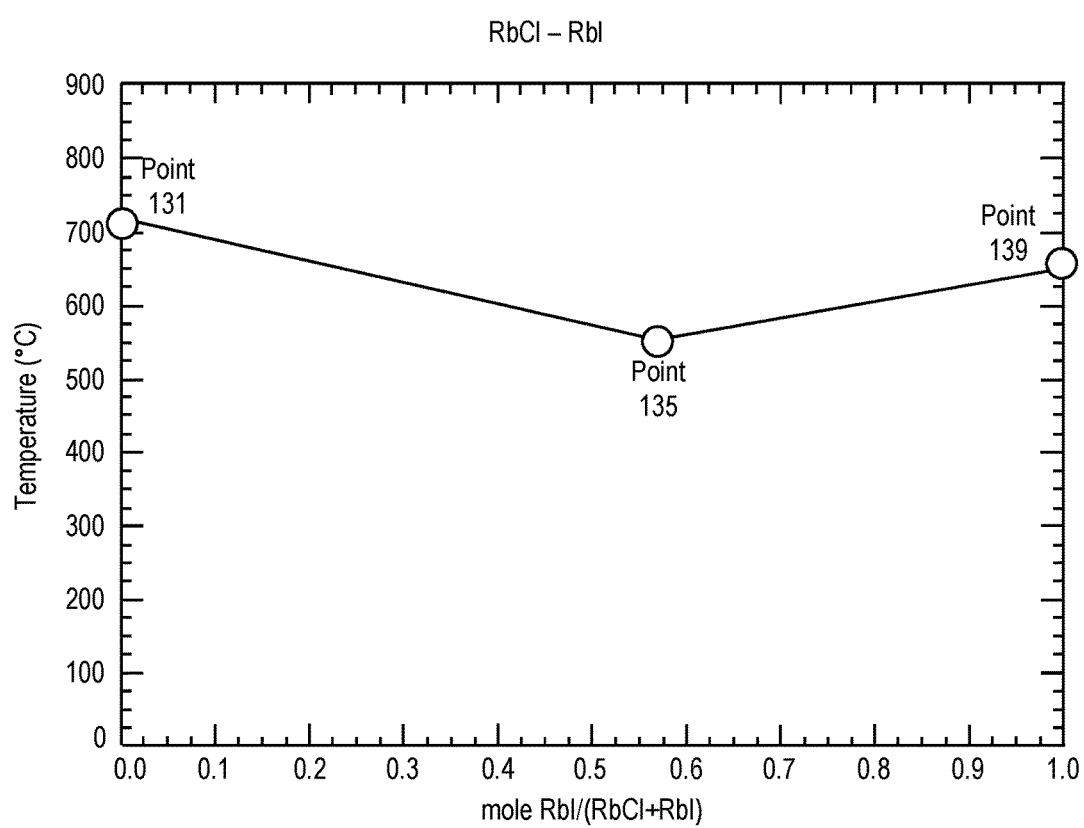

In some embodiments, the eutectic mixture may include two different rubidium halides, in which each of the rubidium halides has a melting point too high for glass treatment, but the eutectic mixture has a eutectic temperature which is lower than its constituent components. FIGS. 1A-1C show phase diagrams for exemplary eutectic mixtures of rubidium halides suitable for use with embodiments of the present invention.

FIG. 1A shows a phase diagram for a eutectic mixture of rubidium bromide (RbBr) and rubidium fluoride (RbF). Pure rubidium bromide (RbBr) has a melting point of 694° C., as shown at in FIG. 1A at Point 111. Pure rubidium fluoride (RbF) has a melting point of 795° C., as shown in FIG. 1A at Point 119. However, a eutectic mixture of rubidium bromide (RbBr) and rubidium fluoride (RbF) has a eutectic temperature (e.g., a minimum melting point) of 518° C. at a eutectic composition of approximately 44.3% RbF when measured by moles, as shown in FIG. 1A at Point 115. Thus, a eutectic mixture of rubidium bromide (RbBr) and rubidium fluoride (RbF) can be selected and prepared so as to have any melting point at least between 518° C. and 694° C., which includes temperatures suitable for glass treatment using rubidium ion exchange.

FIG. 1B shows a phase diagram for a eutectic mixture of rubidium chloride (RbCl) and rubidium fluoride (RbF). Pure rubidium chloride (RbCl) has a melting point of 718° C., as shown at in FIG. 1B at Point 121. Pure rubidium fluoride (RbF) has a melting point of 795° C., as shown in FIG. 1B at Point 129. However, a eutectic mixture of rubidium chloride (RbCl) and rubidium fluoride (RbF) has a eutectic temperature (e.g., a minimum melting point) of 550° C. at a eutectic composition of approximately 46.4% RbF when measured by moles, as shown in FIG. 1B at Point 125. Thus, a eutectic mixture of rubidium chloride (RbCl) and rubidium fluoride (RbF) can be selected and prepared so as to have any melting point at least between 550° C. and 718° C., which includes temperatures suitable for glass treatment using rubidium ion exchange.

FIG. 1C shows a phase diagram for a eutectic mixture of rubidium chloride (RbCl) and rubidium iodide (RbI). Pure rubidium chloride (RbCl) has a melting point of 718° C., as shown at in FIG. 1C at Point 131. Pure rubidium iodide (RbI) has a melting point of 647° C., as shown in FIG. 1C at Point 139. However, a eutectic mixture of rubidium chloride (RbCl) and rubidium iodide (RbI) has a eutectic temperature (e.g., a minimum melting point) of 560° C. at a eutectic composition of approximately 58.5% RbI when measured by moles, as shown in FIG. 1C at Point 135. Thus, a eutectic mixture of rubidium chloride (RbCl) and rubidium iodide (RbI) can be selected and prepared so as to have any melting point at least between 560° C. and 647° C., which includes temperatures suitable for glass treatment using rubidium ion exchange.

In some embodiments, the second salt has a different anion as the first salt. For example, the first salt could be a rubidium salt but the second salt could be a salt of an element other than rubidium. The second salt could have a cation from the same family as the first salt, with either the same anion or a different anion. For example, the first and second salts could both be halides.

FIGS. 2A-2F show phase diagrams for eutectic mixtures of rubidium halides with alkali metal halides suitable for use with embodiments of the present invention, including lithium halides and sodium halides. It should be noted that, when using eutectic mixtures including lithium salts or sodium salts, such as those discussed below with reference to FIGS. 2A-2F, there is a risk that lithium or sodium may diffuse into the glass, which may or may not be problematic.

Figure 2A:
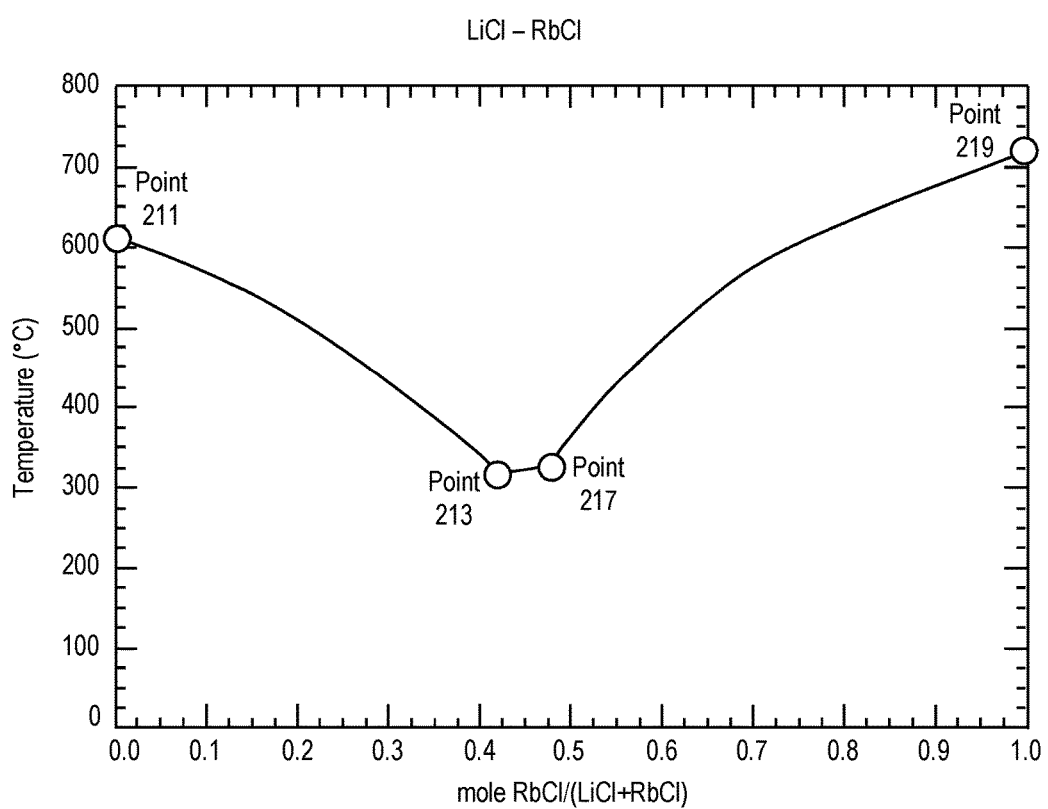
FIGS. 2A-2F show phase diagrams for eutectic mixtures of rubidium halides with alkali metal halides suitable for use with embodiments of the present invention, including lithium halides and sodium halides.

FIG. 2A shows a phase diagram for a eutectic mixture of rubidium chloride (RbCl) and lithium chloride (LiCl). Pure lithium chloride (LiCl) has a melting point of 605° C., as shown in FIG. 2A at Point 211. Pure rubidium chloride (RbCl) has a melting point of 718° C., as shown at in FIG. 2A at Point 219. However, a eutectic mixture of lithium chloride (LiCl) and rubidium chloride (RbCl) has a eutectic temperature (e.g., a minimum melting point) of 313° C. at a eutectic composition of approximately 42.2% RbCl when measured by moles, as shown in FIG. 2A at Point 213. A eutectic mixture of lithium chloride (LiCl) and rubidium chloride (RbCl) has a melting point of 324° C. at a composition of approximately 47.7% RbCl when measured by moles, as shown in FIG. 2A at Point 217. Thus, a eutectic mixture of rubidium chloride (RbCl) and lithium chloride (LiCl) can be selected and prepared so as to have any melting point at least between 324° C. and 718° C., which includes temperatures suitable for glass treatment using rubidium ion exchange.

Figure 2B:
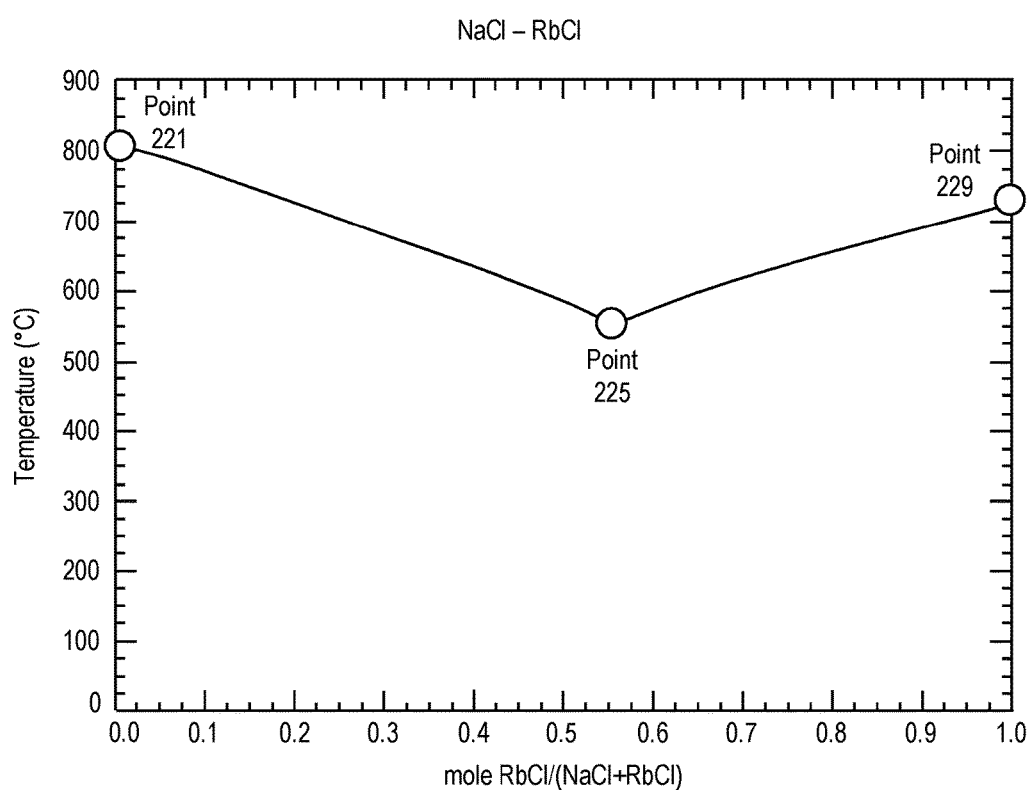

FIG. 2B shows a phase diagram for a eutectic mixture of rubidium chloride (RbCl) and sodium chloride (NaCl). Pure sodium chloride (NaCl) has a melting point of 801° C., as shown in FIG. 2B at Point 221. Pure rubidium chloride (RbCl) has a melting point of 718° C., as shown at in FIG. 2B at Point 229. However, a eutectic mixture of sodium chloride (NaCl) and rubidium chloride (RbCl) has a eutectic temperature (e.g., a minimum melting point) of 550° C. at a eutectic composition of approximately 58.8% RbCl when measured by moles, as shown in FIG. 2B at Point 225. Thus, a eutectic mixture of rubidium chloride (RbCl) and sodium chloride (NaCl) can be selected and prepared so as to have any melting point at least between 550° C. and 718° C., which includes temperatures suitable for glass treatment using rubidium ion exchange.

Figure 2C:
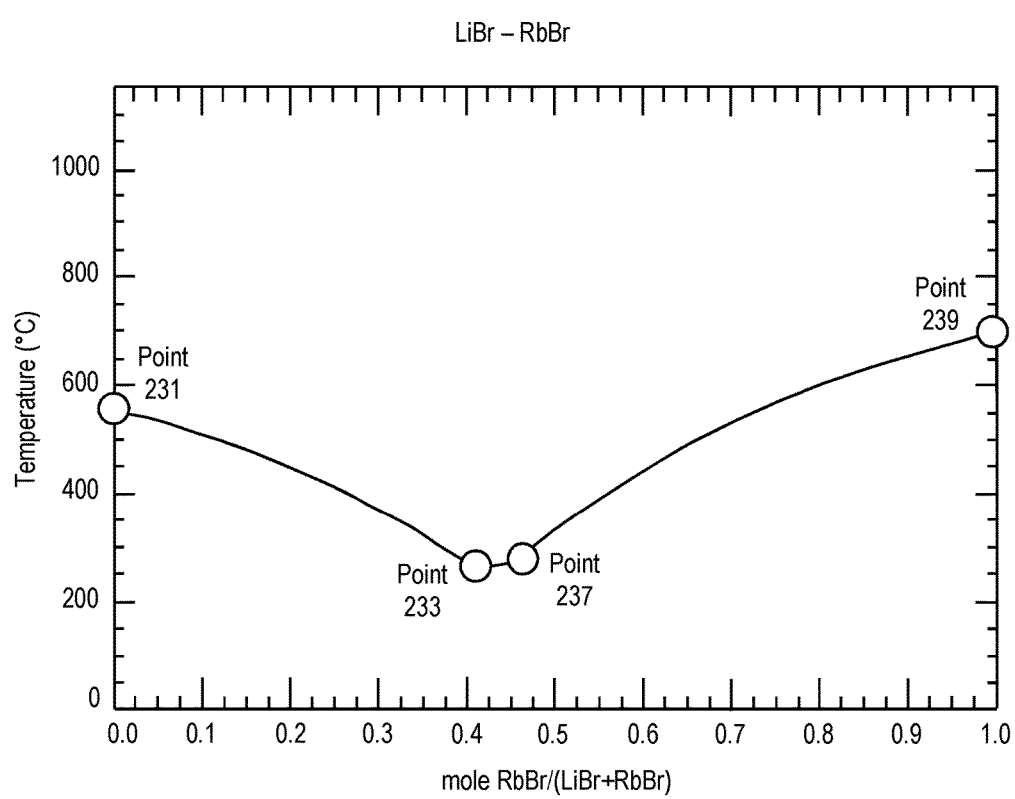

FIG. 2C shows a phase diagram for a eutectic mixture of rubidium bromide (RbBr) and lithium bromide (LiBr). Pure lithium bromide (LiBr) has a melting point of 552° C., as shown in FIG. 2C at Point 231. Pure rubidium bromide (RbBr) has a melting point of 693° C., as shown at in FIG. 2C at Point 239. However, a eutectic mixture of lithium bromide (LiBr) and rubidium bromide (RbBr) has a eutectic temperature (e.g., a minimum melting point) of 262° C. at a eutectic composition of approximately 41% RbBr when measured by moles, as shown in FIG. 2C at Point 233. A eutectic mixture of lithium bromide (LiBr) and rubidium bromide (RbBr) has a melting point of 272° C. at a composition of approximately 45.3% RbBr when measured by moles, as shown in FIG. 2C at Point 237. Thus, a eutectic mixture of rubidium bromide (RbBr) and lithium bromide (LiBr) can be selected and prepared so as to have any melting point at least between 272° C. and 693° C., which includes temperatures suitable for glass treatment using rubidium ion exchange.

Figure 2D:
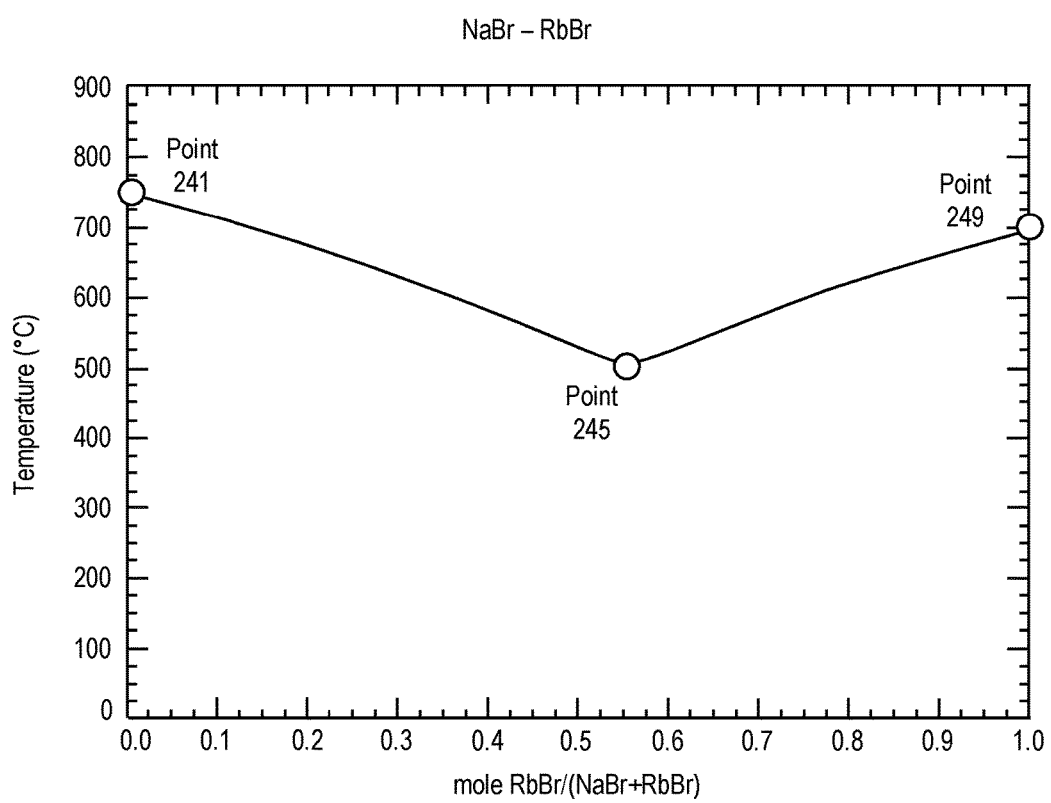

FIG. 2D shows a phase diagram for a eutectic mixture of rubidium bromide (RbBr) and sodium bromide (NaBr). Pure sodium bromide (NaBr) has a melting point of 747° C., as shown in FIG. 2D at Point 241. Pure rubidium bromide (RbBr) has a melting point of 693° C., as shown at in FIG. 2D at Point 249. However, a eutectic mixture of sodium bromide (NaBr) and rubidium bromide (RbBr) has a eutectic temperature (e.g., a minimum melting point) of 497° C. at a eutectic composition of approximately 55.3% RbBr when measured by moles, as shown in FIG. 2D at Point 245. Thus, a eutectic mixture of rubidium bromide (RbBr) and sodium bromide (NaBr) can be selected and prepared so as to have any melting point at least between 497° C. and 693° C., which includes temperatures suitable for glass treatment using rubidium ion exchange.

Figure 2E:
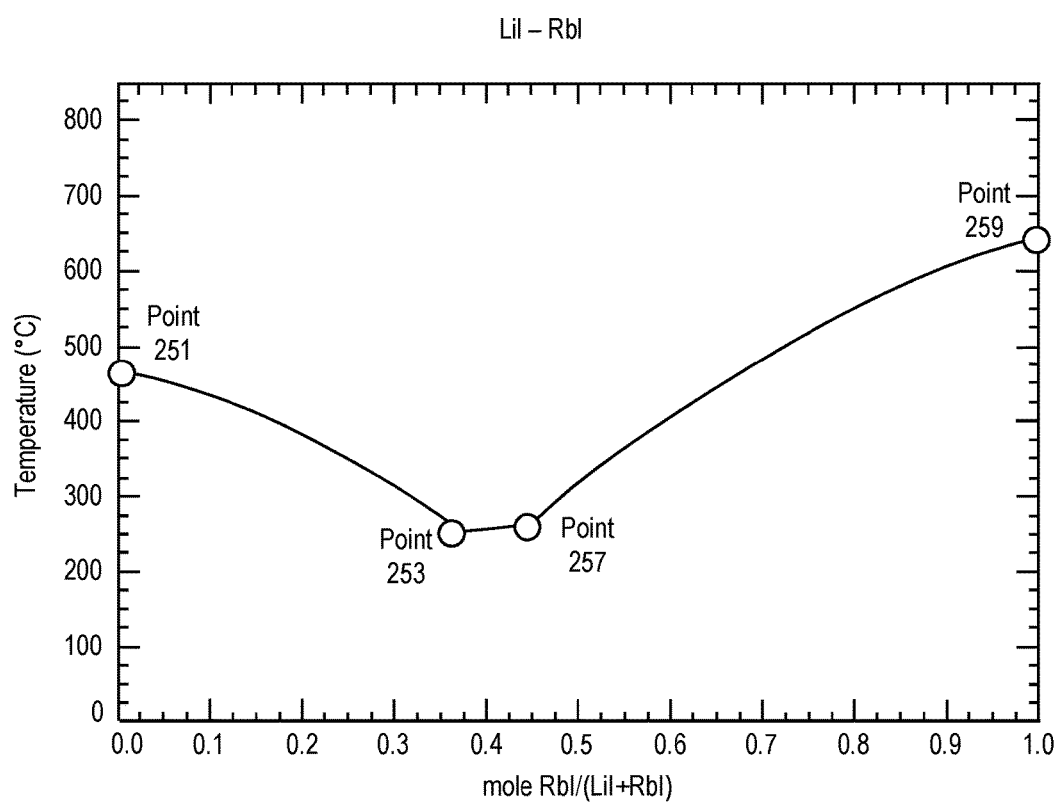

FIG. 2E shows a phase diagram for a eutectic mixture of rubidium iodide (RbI) and lithium iodide (LiI). Pure lithium bromide (LiI) has a melting point of 469° C., as shown in FIG. 2E at Point 251. Pure rubidium iodide (RbI) has a melting point of 647° C., as shown at in FIG. 2E at Point 259. However, a eutectic mixture of lithium iodide (LiI) and rubidium iodide (RbI) has a eutectic temperature (e.g., a minimum melting point) of 252° C. at a eutectic composition of approximately 37.5% RbI when measured by moles, as shown in FIG. 2E at Point 253. A eutectic mixture of lithium iodide (LiI) and rubidium iodide (RbI) has a melting point of 260° C. at a composition of approximately 43.6% RbI when measured by moles, as shown in FIG. 2E at Point 237. Thus, a eutectic mixture of rubidium iodide (RbI) and lithium iodide (LiI) can be selected and prepared so as to have any melting point at least between 260° C. and 647° C., which includes temperatures suitable for glass treatment using rubidium ion exchange.

Figure 2F:
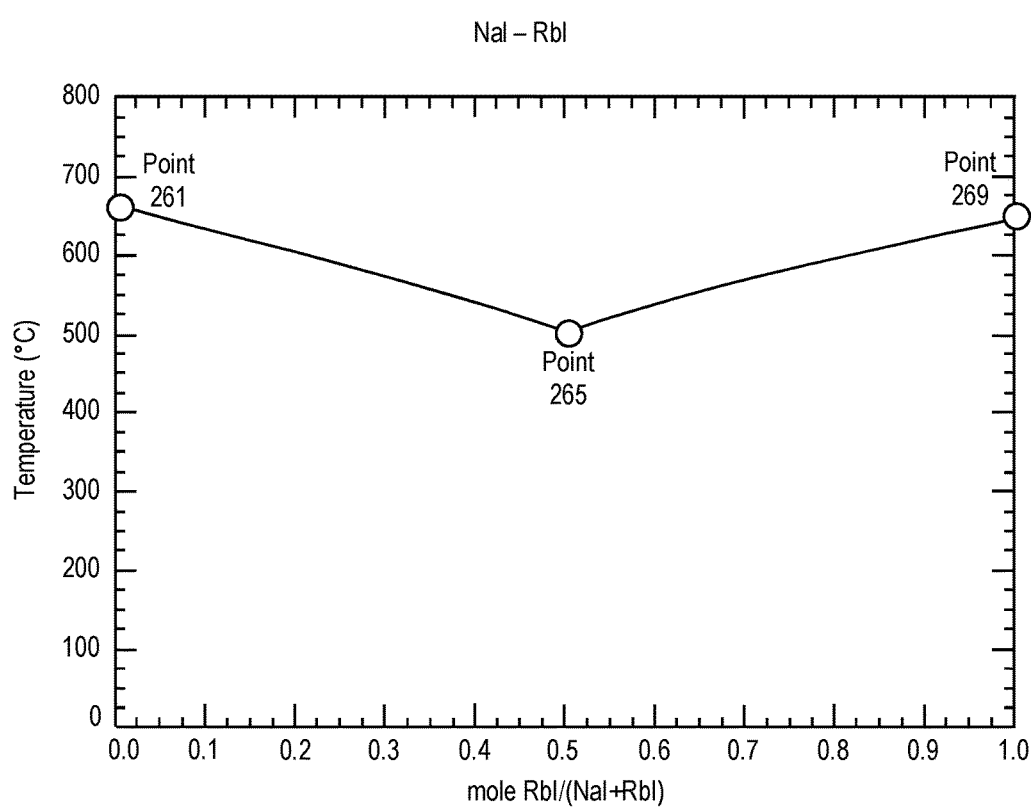

FIG. 2F shows a phase diagram for a eutectic mixture of rubidium iodide (RbI) and sodium iodide (NaI). Pure sodium iodide (NaI) has a melting point of 661° C., as shown in FIG. 2F at Point 261. Pure rubidium iodide (RbI) has a melting point of 647° C., as shown at in FIG. 2F at Point 269. However, a eutectic mixture of sodium iodide (NaI) and rubidium iodide (RbI) has a eutectic temperature (e.g., a minimum melting point) of 505° C. at a eutectic composition of approximately 50.3% RbI when measured by moles, as shown in FIG. 2F at Point 265. Thus, a eutectic mixture of rubidium iodide (RbI) and sodium iodide (NaI) can be selected and prepared so as to have any melting point at least between 505° C. and 647° C., which includes temperatures suitable for glass treatment using rubidium ion exchange.

In some embodiments, the second salt could have the same cation as the first salt, but a different anion. For example, the first and second salt could both be chlorides. More specifically, the first salt could be rubidium chloride (RbCl) and the second salt could be another chloride. For example, the second salt could be a chloride of an alkaline earth metal found in Group 2 of the periodic table, such as magnesium (Mg), calcium (Ca), strontium (Sr), or barium (Ba). The second salt could also be a chloride of another cation such as, for example, aluminum (Al), cadmium (Cd), lead (Pb), scandium (Sc), uranium (U), or zinc (Zn).

Figure 3A:
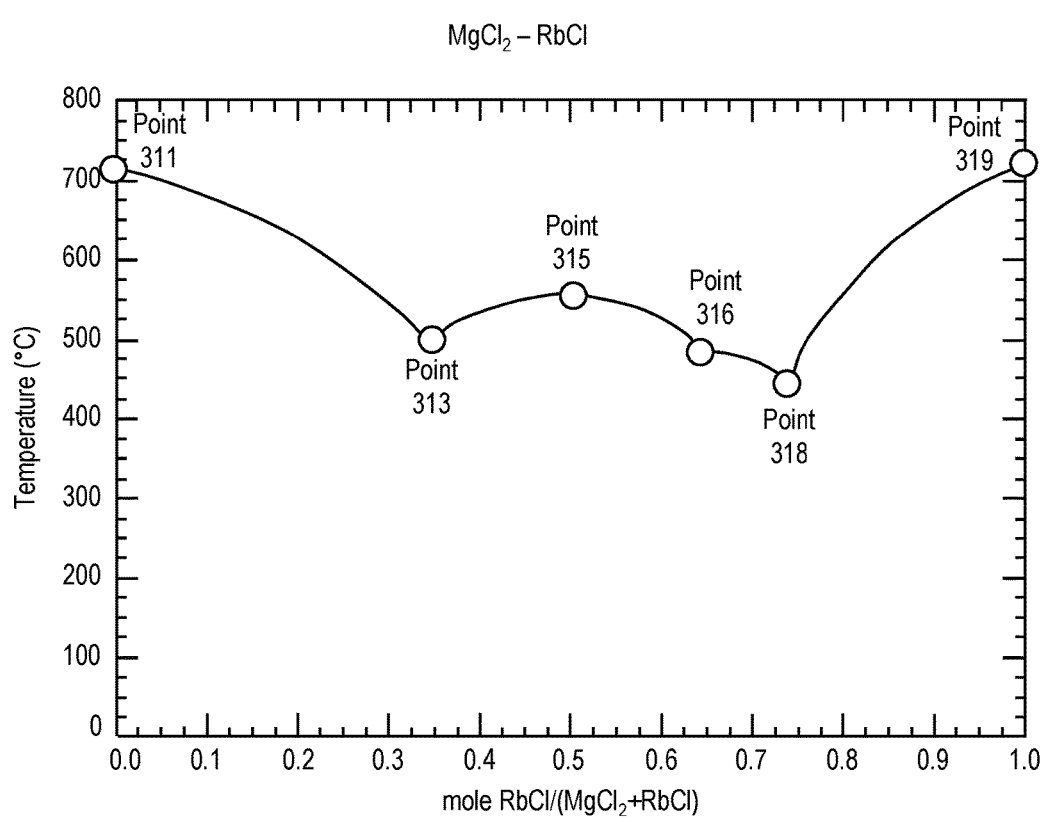
FIGS. 3A-3D show phase diagrams for eutectic mixtures of rubidium chloride with alkaline earth metal chlorides suitable for use with embodiments of the present invention.

FIGS. 3A-3D show phase diagrams for eutectic mixtures of rubidium chloride with alkaline earth metal chlorides suitable for use with embodiments of the present invention. FIG. 3A shows a phase diagram for a eutectic mixture of rubidium chloride (RbCl) and magnesium chloride (MgCl$_2$). Pure magnesium chloride (MgCl$_2$) has a melting point of 714° C., as shown in FIG. 3A at Point 311. Pure rubidium chloride (RbCl) has a melting point of 718° C., as shown at in FIG. 3A at Point 319. A eutectic mixture of rubidium chloride and magnesium chloride has a melting point of 499° C. at a composition of approximately 34.6% RbCl when measured by moles, as shown in FIG. 3A at Point 313. A eutectic mixture of rubidium chloride and magnesium chloride has a melting point of 554° C. at a composition of approximately 50% RbCl when measured by moles, as shown in FIG. 3A at Point 315. A eutectic mixture of rubidium chloride and magnesium chloride has a melting point of 478° C. at a composition of approximately 64.7% RbCl when measured by moles, as shown in FIG. 3A at Point 316. A eutectic mixture of rubidium chloride and magnesium chloride has a eutectic temperature (e.g., a minimum melting point) of 447° C. at a eutectic composition of approximately 73.9% RbCl when measured by moles, as shown in FIG. 3A at Point 318. Thus, a eutectic mixture of magnesium chloride and rubidium chloride can be selected and prepared so as to have any melting point at least between 447° C. and 718° C. (i.e., between the eutectic point 318 and pure rubidium chloride 319), which includes temperatures suitable for glass treatment using rubidium ion exchange.

Figure 3B:
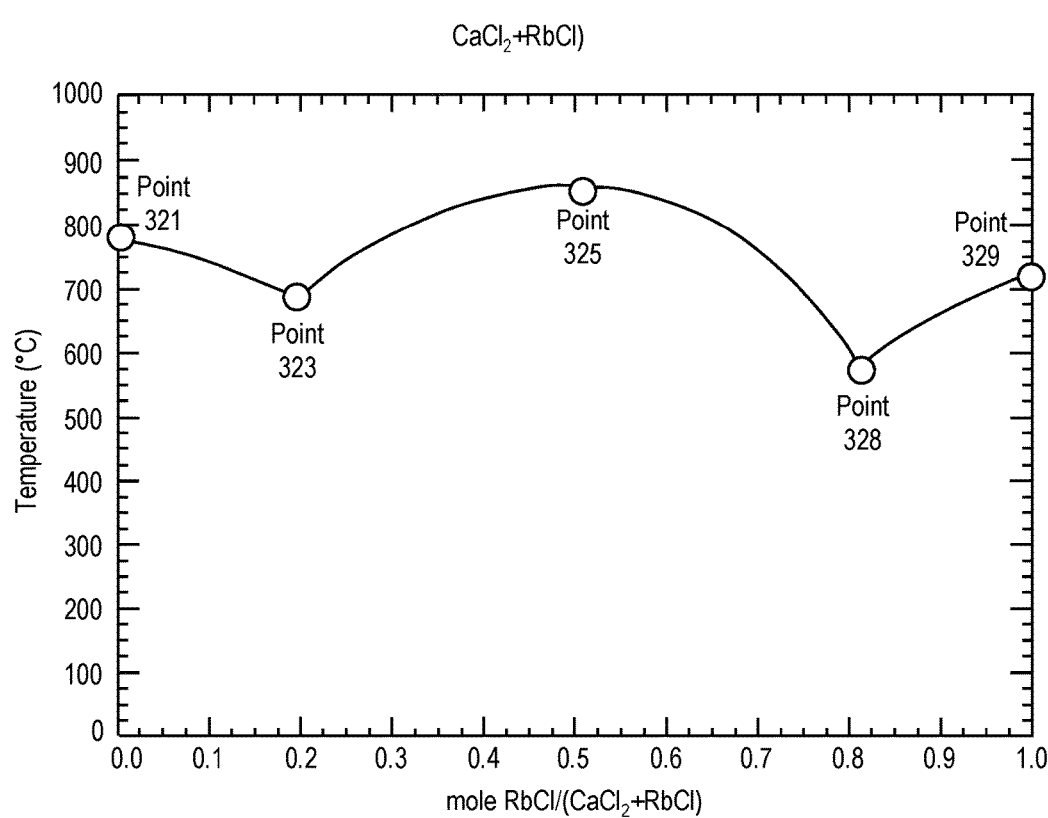

FIG. 3B shows a phase diagram for a eutectic mixture of rubidium chloride (RbCl) and calcium chloride (CaCl$_2$). Pure calcium chloride (CaCl$_2$) has a melting point of 772° C., as shown in FIG. 3B at Point 321. Pure rubidium chloride (RbCl) has a melting point of 718° C., as shown at in FIG. 3B at Point 329. A eutectic mixture of rubidium chloride and calcium chloride has a melting point of 683° C. at a composition of approximately 19.7% RbCl when measured by moles, as shown in FIG. 3B at Point 323. A eutectic mixture of rubidium chloride and calcium chloride has a melting point of 859° C. at a composition of approximately 50% RbCl when measured by moles, as shown in FIG. 3B at Point 325. A eutectic mixture of rubidium chloride and calcium chloride has a eutectic temperature (e.g., a minimum melting point) of 576° C. at a eutectic composition of approximately 81.3% RbCl when measured by moles, as shown in FIG. 3B at Point 328. Thus, a eutectic mixture of calcium chloride and rubidium chloride can be selected and prepared so as to have any melting point at least between 576° C. and 718° C. (i.e., between the eutectic point 328 and pure rubidium chloride 329), which includes temperatures suitable for glass treatment using rubidium ion exchange.

Figure 3C:
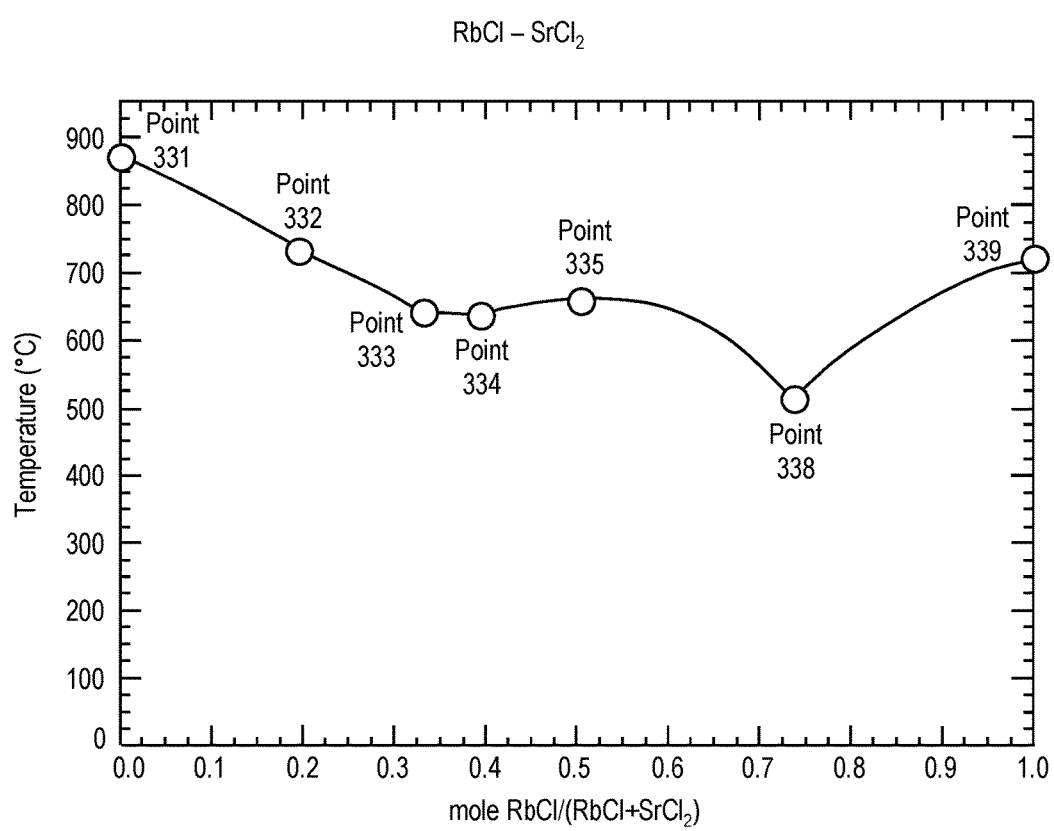

FIG. 3C shows a phase diagram for a eutectic mixture of rubidium chloride (RbCl) and strontium chloride (SrCl$_2$). Pure strontium chloride (SrCl$_2$) has a melting point of 874° C., as shown in FIG. 3C at Point 331. Pure rubidium chloride (RbCl) has a melting point of 718° C., as shown at in FIG. 3C at Point 339. A eutectic mixture of rubidium chloride and strontium chloride has a melting point of 727° C. at a composition of approximately 20.3% RbCl when measured by moles, as shown in FIG. 3C at Point 332. A eutectic mixture of rubidium chloride and strontium chloride has a melting point of 634° C. at a composition of approximately 34% RbCl when measured by moles, as shown in FIG. 3C at Point 333. A eutectic mixture of rubidium chloride and strontium chloride has a melting point of 632° C. at a composition of approximately 37.7% RbCl when measured by moles, as shown in FIG. 3C at Point 334. A eutectic mixture of rubidium chloride and strontium chloride has a melting point of 659° C. at a composition of approximately 50% RbCl when measured by moles, as shown in FIG. 3C at Point 335. A eutectic mixture of rubidium chloride and strontium chloride has a eutectic temperature (e.g., a minimum melting point) of 510° C. at a eutectic composition of approximately 73.6% RbCl when measured by moles, as shown in FIG. 3C at Point 338. Thus, a eutectic mixture of strontium chloride and rubidium chloride can be selected and prepared so as to have any melting point at least between 510° C. and 718° C. (i.e., between the eutectic point 338 and pure rubidium chloride 339), which includes temperatures suitable for glass treatment using rubidium ion exchange.

Figure 3D:
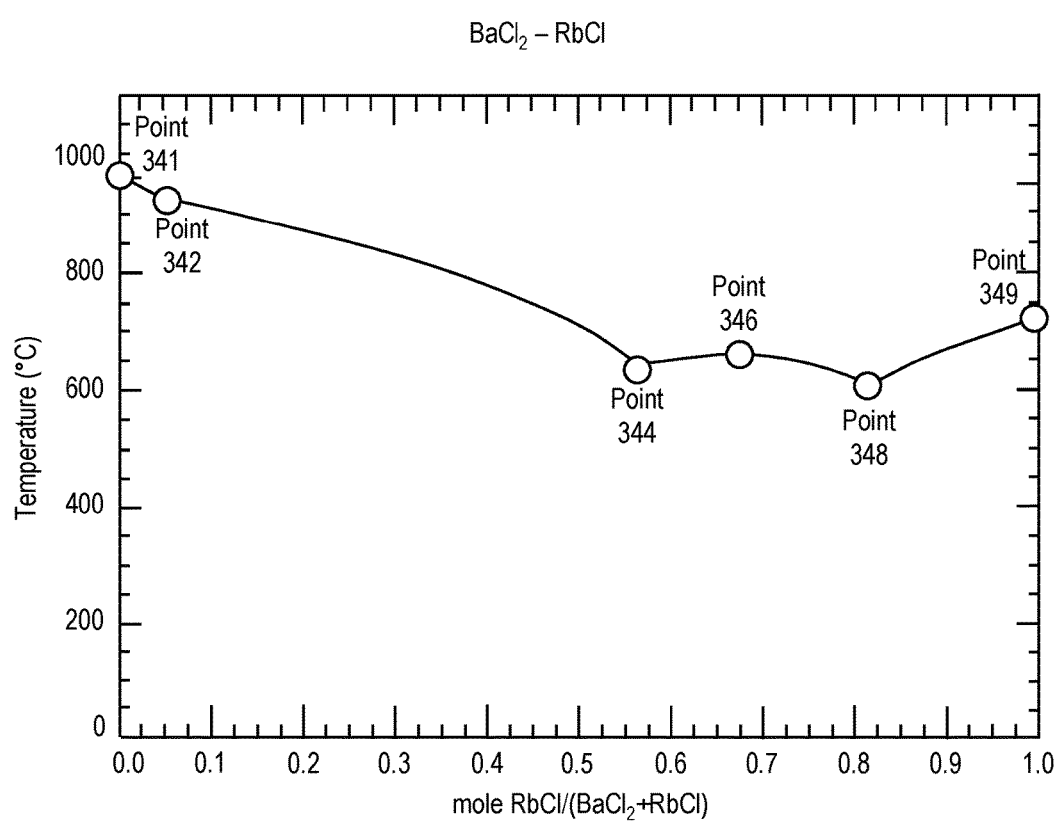

FIG. 3D shows a phase diagram for a eutectic mixture of rubidium chloride (RbCl) and barium chloride (BaCl$_2$). Pure barium chloride (BaCl$_2$) has a melting point of 962° C., as shown in FIG. 3D at Point 341. Pure rubidium chloride (RbCl) has a melting point of 718° C., as shown at in FIG. 3D at Point 349. A eutectic mixture of rubidium chloride and barium chloride has a melting point of 925° C. at a composition of approximately 4.7% RbCl when measured by moles, as shown in FIG. 3D at Point 342. A eutectic mixture of rubidium chloride and barium chloride has a melting point of 639° C. at a composition of approximately 56.6% RbCl when measured by moles, as shown in FIG. 3D at Point 344. A eutectic mixture of rubidium chloride and barium chloride has a melting point of 657° C. at a composition of approximately 66% RbCl when measured by moles, as shown in FIG. 3D at Point 346. A eutectic mixture of rubidium chloride and barium chloride has a eutectic temperature (e.g., a minimum melting point) of 603° C. at a eutectic composition of approximately 81.4% RbCl when measured by moles, as shown in FIG. 3D at Point 348. Thus, a eutectic mixture of barium chloride and rubidium chloride can be selected and prepared so as to have any melting point at least between 603° C. and 718° C. (i.e., between the eutectic point 348 and pure rubidium chloride 349), which includes temperatures suitable for glass treatment using rubidium ion exchange.

Figure 4A:
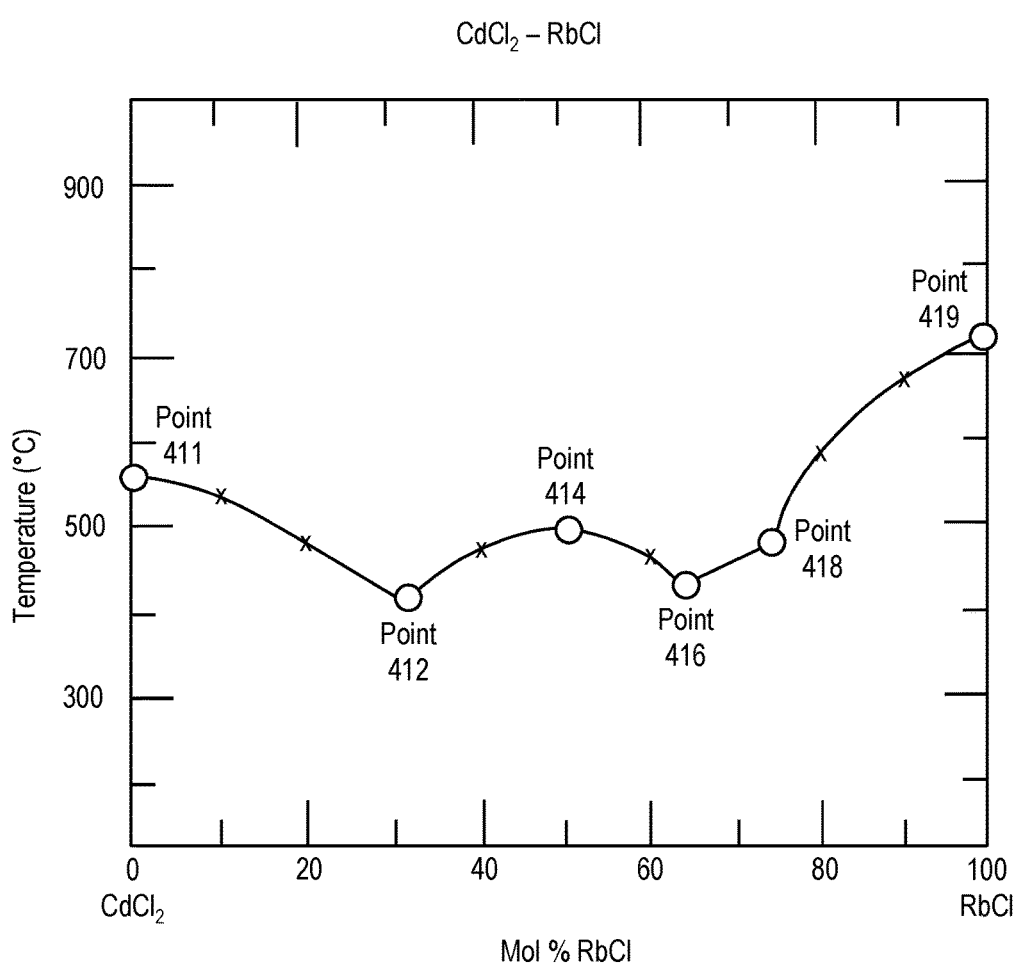
FIGS. 4A-4E show phase diagrams for eutectic mixtures of rubidium chloride with other chlorides suitable for use with embodiments of the present invention.

FIGS. 4A-4E show phase diagrams for eutectic mixtures of rubidium chloride with other chlorides. FIG. 4A shows a phase diagram for a eutectic mixture of rubidium chloride (RbCl) and cadmium chloride ($CdCl_2$). Pure cadmium chloride ($CdCl_2$) has a melting point of 564° C., as shown in FIG. 4A at Point 411. Pure rubidium chloride (RbCl) has a melting point of 718° C., as shown at in FIG. 4A at Point 419. A eutectic mixture of cadmium chloride and rubidium chloride has a melting point of approximately 480° C. at Point 418. Thus, a eutectic mixture of cadmium chloride and rubidium chloride can be selected and prepared so as to have any melting point between at least 480° C. and 718° C. (i.e., between Point 418 and Point 419), which includes temperatures suitable for glass treatment using rubidium ion exchange.

Figure 4B:
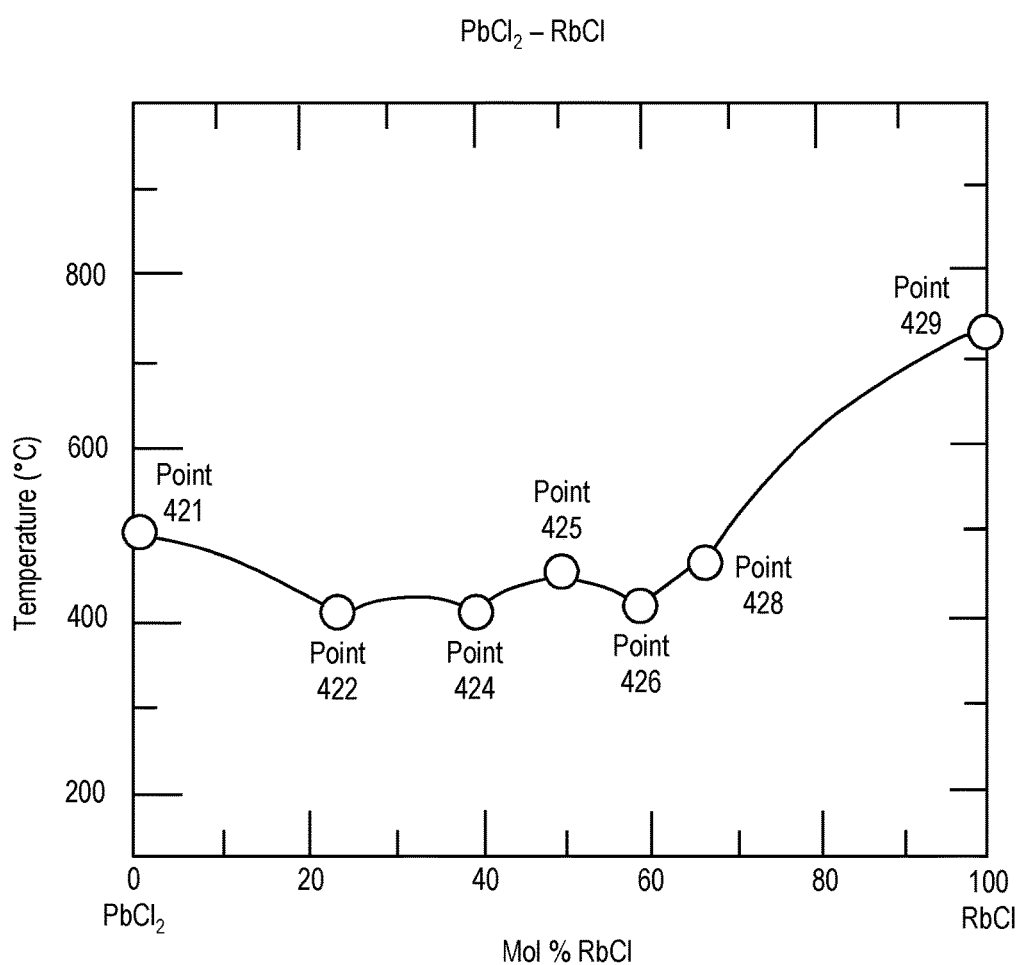

FIG. 4B shows a phase diagram for a eutectic mixture of rubidium chloride (RbCl) and lead chloride ($PbCl_2$). Pure lead chloride ($PbCl_2$) has a melting point of 501° C., as shown in FIG. 4B at Point 421. Pure rubidium chloride (RbCl) has a melting point of 718° C., as shown at in FIG. 4B at Point 429. A eutectic mixture of lead (II) chloride and rubidium chloride has a melting point of approximately 450° C. at Point 428, which represents a concentration of approximately 66.7% RbCl when measured by moles. Thus, a eutectic mixture of lead (II) chloride and rubidium chloride can be selected and prepared so as to have any melting point between at least 450° C. and 718° C. (i.e., between Point 428 and Point 429), which includes temperatures suitable for glass treatment using rubidium ion exchange.

Figure 4C:
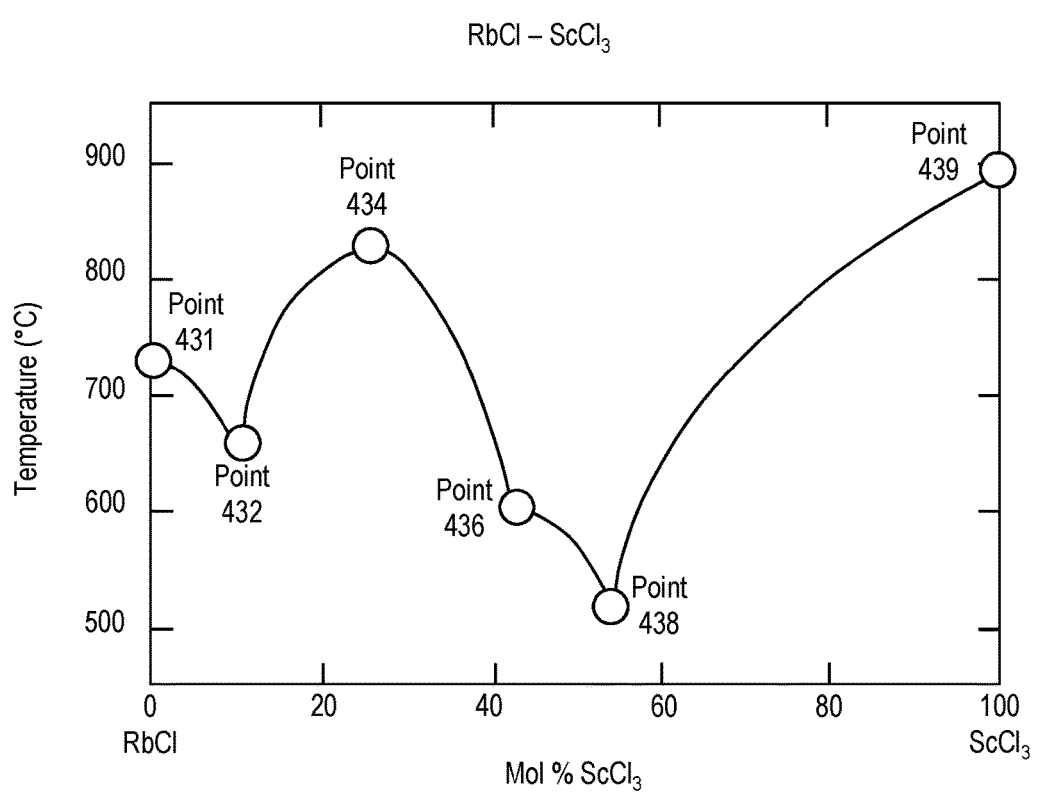

FIG. 4C shows a phase diagram for a eutectic mixture of rubidium chloride (RbCl) and scandium chloride ($ScCl_3$). Pure rubidium chloride (RbCl) has a melting point of 718° C., as shown at in FIG. 4C at Point 431. Pure scandium chloride ($ScCl_3$) has a melting point of 960° C., as shown in FIG. 4C at Point 439. A eutectic mixture of scandium chloride and rubidium chloride has a eutectic temperature (e.g., a minimum melting point) of approximately 520° C. at Point 438. Thus, a eutectic mixture of cadmium chloride and rubidium chloride can be selected and prepared so as to have any melting point between at least 520° C. and 718° C., which includes temperatures suitable for glass treatment using rubidium ion exchange.

Figure 4D:
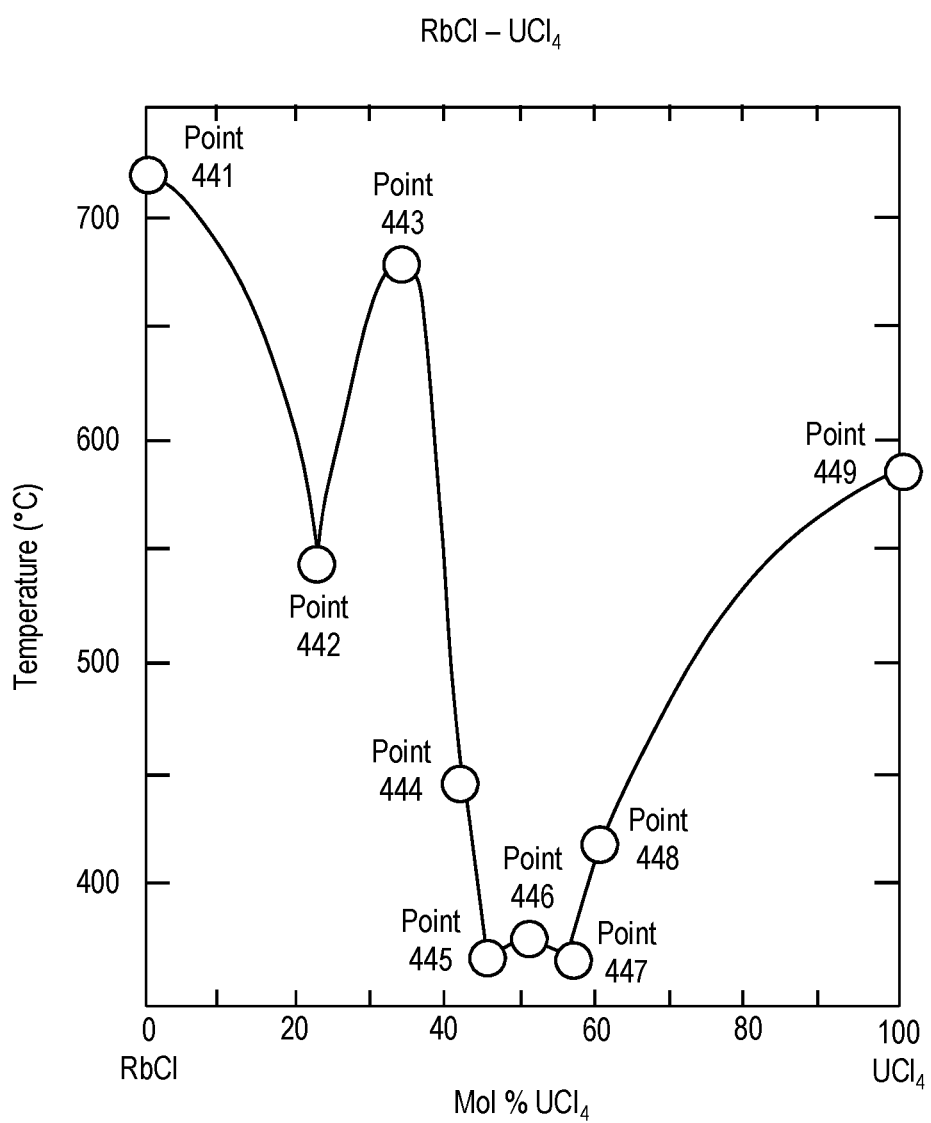

FIG. 4D shows a phase diagram for a eutectic mixture of rubidium chloride (RbCl) and uranium tetrachloride ($UCl_4$). Pure rubidium chloride (RbCl) has a melting point of 718° C., as shown at in FIG. 4D at Point 441. Pure uranium tetrachloride ($UCl_4$) has a melting point of 590° C., as shown in FIG. 4D at Point 449. A eutectic mixture of uranium tetrachloride and rubidium chloride has a melting point of 546° C. at Point 442. A eutectic mixture of uranium tetrachloride and rubidium chloride has a melting point of 676° C. at Point 443. A eutectic mixture of uranium tetrachloride and rubidium chloride has a melting point of 448° C. at Point 444. A eutectic mixture of uranium tetrachloride and rubidium chloride has a eutectic temperature (e.g., a minimum melting point) of 368° C. at Point 445. A eutectic mixture of uranium tetrachloride and rubidium chloride has a melting point of 376° C. at Point 446. A eutectic mixture of uranium tetrachloride and rubidium chloride has a melting point of 370° C. at Point 447. A eutectic mixture of uranium tetrachloride and rubidium chloride has a melting point of 418° C. at Point 448. Thus, a eutectic mixture of uranium tetrachloride and rubidium chloride can be selected and prepared so as to have any melting point between at least 418° C. and 718° C., which includes temperatures suitable for glass treatment using rubidium ion exchange.

Figure 4E:
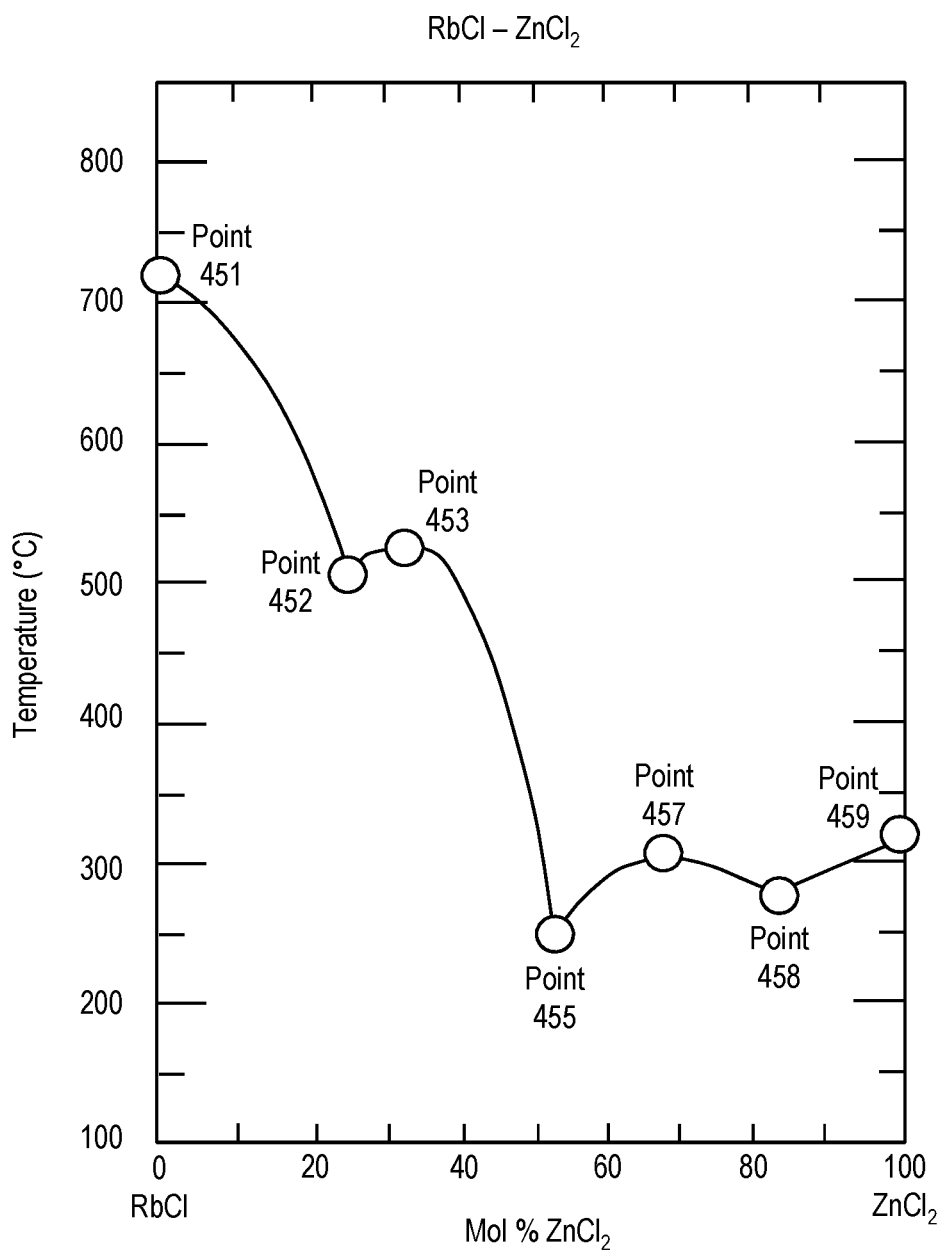

FIG. 4E shows a phase diagram for a eutectic mixture of rubidium chloride (RbCl) and zinc chloride ($ZnCl_2$). Pure rubidium chloride (RbCl) has a melting point of 718° C., as shown at in FIG. 4E at Point 451. Pure zinc chloride ($ZnCl_2$) has a melting point of 314° C., as shown in FIG. 4E at Point 459. A eutectic mixture of zinc chloride and rubidium chloride has a melting point of 510° C. at Point 452. A eutectic mixture of zinc chloride and rubidium chloride has a melting point of 528° C. at Point 453, which represents a concentration of approximately 66.7% RbCl when measured by moles. A eutectic mixture of zinc chloride and rubidium chloride has a eutectic temperature (e.g., a minimum melting point) of approximately 249° C. at Point 455. A eutectic mixture of zinc chloride and rubidium chloride has a melting point of 306° C. at Point 457, which represents a concentration of approximately 33.3% RbCl when measured by moles. A eutectic mixture of zinc chloride and rubidium chloride has a melting point of 277° C. at Point 458. Thus, a eutectic mixture of zinc chloride and rubidium chloride can be selected and prepared so as to have any melting point between at least 510° C. and 718° C., which includes temperatures suitable for glass treatment using rubidium ion exchange.

Figure 5:
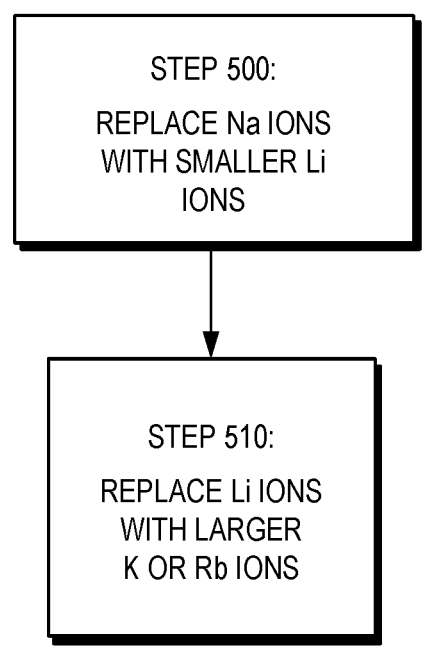
FIG. 5 shows a flow chart for an illustrative technique for a multi-step ion exchange according to an embodiment of the present invention.

FIG. 5 shows a flow chart for an illustrative technique for a multi-step ion exchange according to an embodiment of the present invention. A first step (500) includes replacing sodium (Na) ions in the glass with a smaller ion, such as lithium (Li). A second step (510) includes replacing these smaller ions, such as lithium ions, with larger ions, such as potassium (K) or rubidium (Rb). Lithium, sodium, potassium, and rubidium are all alkali metals found in Group I of the periodic table. Lithium ions are smaller than sodium ions. Rubidium ions and potassium ions are both larger than sodium ions and lithium ions, with rubidium ions being larger than potassium ions. Thus, illustrative embodiments result in an increased ion size contrast because an ion exchange now involves replacement of lithium, rather than sodium, with potassium or rubidium. This increased ion size contrast advantageously produces an enhanced tolerance to compressive stress.

Figure 6A:
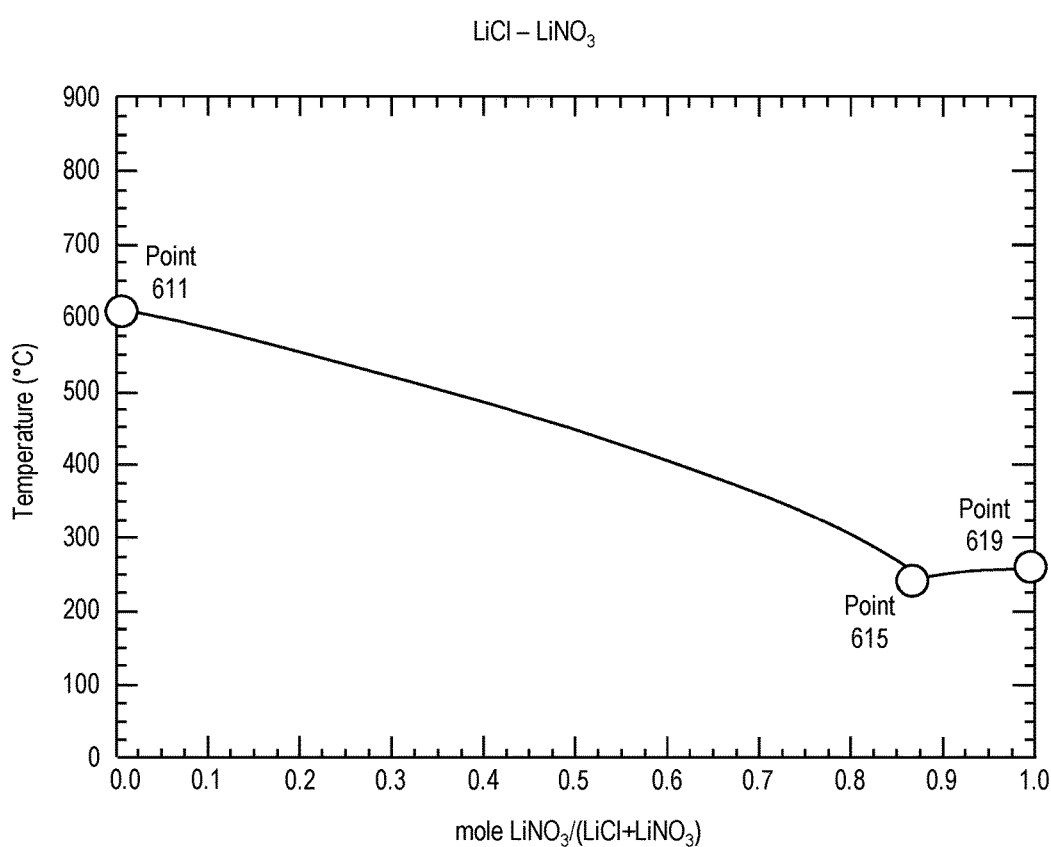
FIGS. 6A and 6B show phase diagrams for eutectic mixtures of lithium nitrate and lithium halides suitable for use in step 500 in FIG. 5.
Figure 6B:
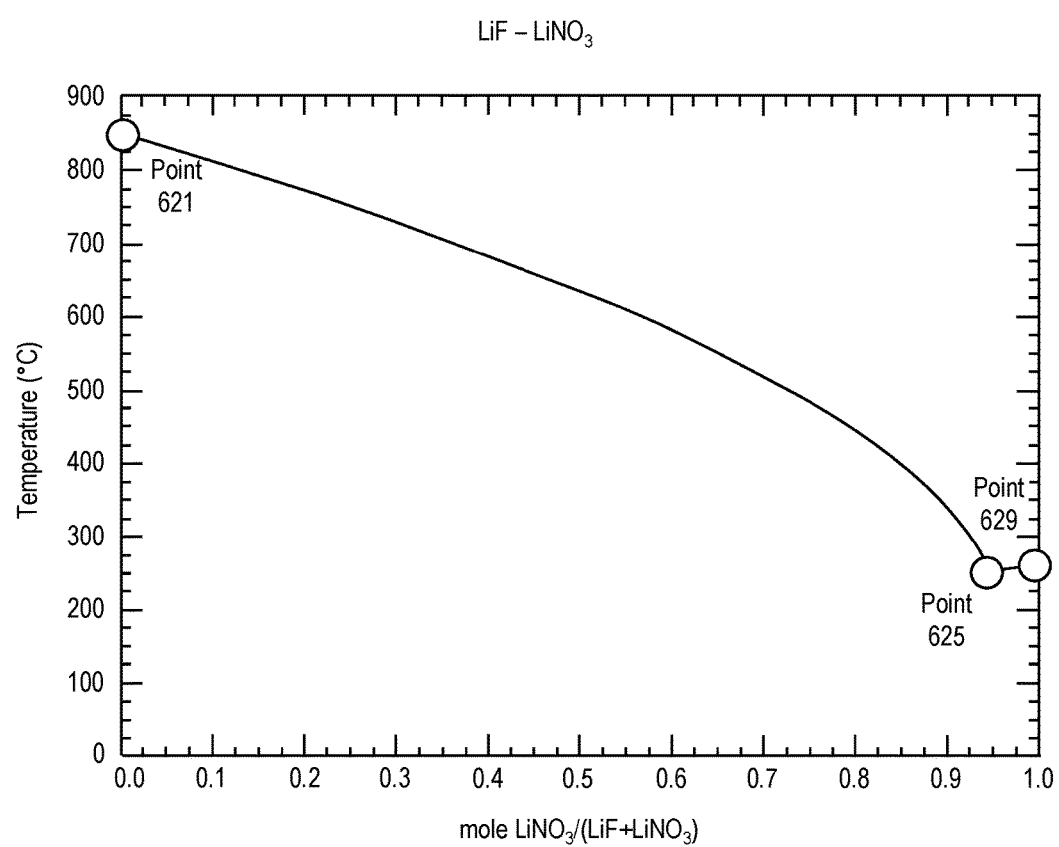

Embodiments of step 500 in FIG. 5 may involve treating the glass with a lithium salt, thereby causing sodium ions in the glass to be replaced with lithium ions. In one or more embodiments, a pure lithium salt is used. In one or more other embodiments, it is beneficial to utilize a eutectic mixture including at least one lithium salt. One or more other embodiments include utilizing a eutectic mixture including a plurality of lithium salts. One or more other embodiments include utilizing a eutectic mixture including a first lithium salt having a relatively low melting point, such as lithium nitrate, and a second lithium salt having a relatively high melting point, such as a lithium halide. FIGS. 6A and 6B show phase diagrams for eutectic mixtures of lithium nitrate and lithium halides suitable for use in step 500 in FIG. 5.

FIG. 6A shows a phase diagram for a eutectic mixture of lithium nitrate ($LiNO_3$) and lithium chloride (LiCl). Pure lithium chloride (LiCl) has a melting point of 605° C., as shown in FIG. 6A at Point 611. Pure lithium nitrate ($LiNO_3$) has a melting point of 255° C., as shown at in FIG. 6A at Point 619. However, a eutectic mixture of lithium chloride (LiCl) and lithium nitrate ($LiNO_3$) has a eutectic temperature (e.g., a minimum melting point) of 243° C. at a eutectic composition of approximately 87.4% $LiNO_3$ when measured by moles, as shown in FIG. 6A at Point 615. Thus, a eutectic mixture of lithium nitrate ($LiNO_3$) and lithium chloride (LiCl) can be selected and prepared so as to have any melting point at least between 243° C. and 610° C., which includes temperatures suitable for glass treatment using lithium ion exchange, such as step 500 in FIG. 5.

FIG. 6B shows a phase diagram for a eutectic mixture of lithium nitrate ($LiNO_3$) and lithium fluoride (LiF). Pure lithium fluoride (LiF) has a melting point of 845° C., as shown in FIG. 6B at Point 621. Pure lithium nitrate ($LiNO_3$) has a melting point of 255° C., as shown at in FIG. 6B at Point 629. However, a eutectic mixture of lithium fluoride (LiF) and lithium nitrate ($LiNO_3$) has a eutectic temperature (e.g., a minimum melting point) of 250° C. at a eutectic composition of approximately 95.3% $LiNO_3$ when measured by moles, as shown in FIG. 6B at Point 625. Thus, a eutectic mixture of lithium nitrate ($LiNO_3$) and lithium fluoride (LiF) can be selected and prepared so as to have any melting point at least between 243° C. and 848° C., which includes temperatures suitable for glass treatment using lithium ion exchange, such as step 500 in FIG. 5.

Embodiments of step 510 in FIG. 5 may involve treating the glass with a potassium or rubidium salt, thereby causing lithium ions in the glass to be replaced with potassium or rubidium ions. In one or more embodiments, a pure potassium or rubidium salt is used. In one or more other embodiments, it is beneficial to utilize a eutectic mixture including at least one potassium or rubidium salt. Eutectic mixtures of rubidium salts which are suitable for use in step 510 in FIG. 5 include mixtures of a rubidium halide, such as rubidium bromide (RbBr) or rubidium chloride (RbCl), with rubidium nitrate ($RbNO_3$) or rubidium hydroxide (RbOH), as discussed above. Other eutectic mixtures including at least one rubidium salt which are suitable for use in step 510 in FIG. 5 include those discussed above with reference to FIGS. 1A-4E.

Figure 7A:
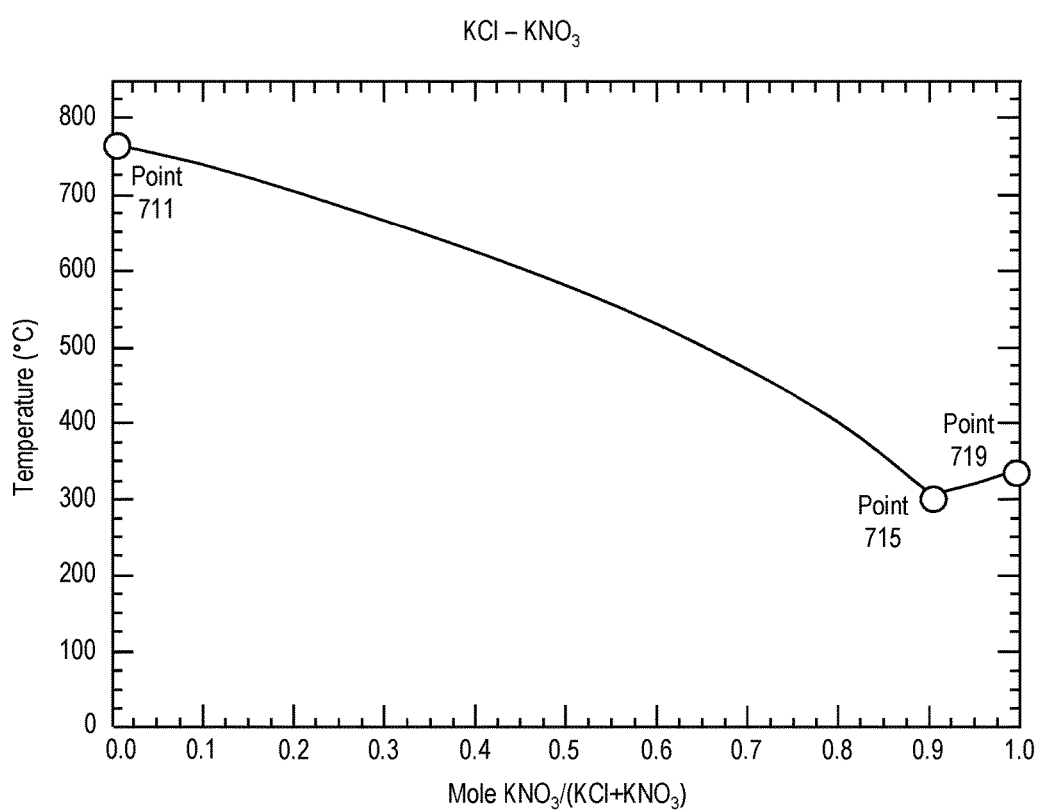
FIGS. 7A and 7B show phase diagrams for eutectic mixtures of potassium nitrate and potassium halides suitable for use in step 510 in FIG. 5.
Figure 7B:
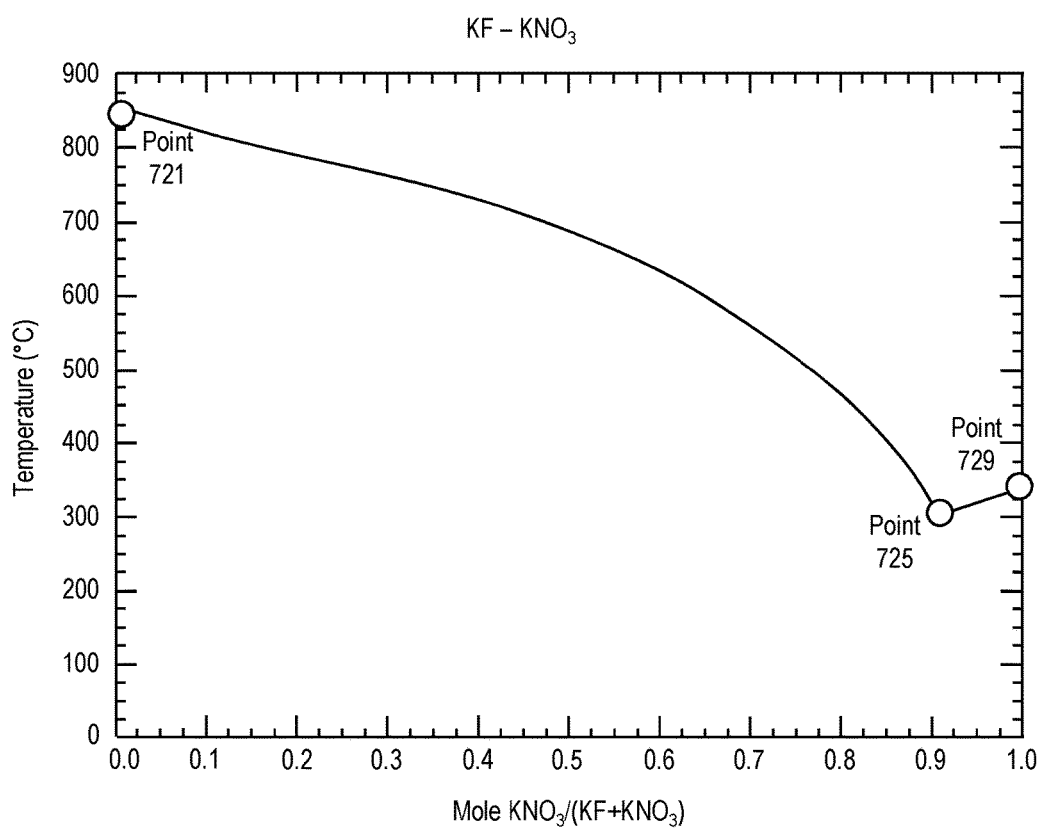

In one or more embodiments, it is be beneficial to utilize a eutectic mixture including at least one potassium salt. One or more other embodiments include utilizing a eutectic mixture including a plurality of potassium salts. One or more other embodiments include utilizing a eutectic mixture including a first potassium salt having a relatively low melting point, such as potassium nitrate, and a second potassium salt having a relatively high melting point, such as a potassium halide. FIGS. 7A and 7B show phase diagrams for eutectic mixtures of potassium nitrate and potassium halides suitable for use in step 510 in FIG. 5.

FIG. 7A shows a phase diagram for a eutectic mixture of potassium nitrate ($KNO_3$) and potassium chloride (KCl). Pure potassium chloride (KCl) has a melting point of 770° C., as shown in FIG. 7A at Point 711. Pure potassium nitrate ($KNO_3$) has a melting point of 334° C., as shown at in FIG. 7A at Point 719. However, a eutectic mixture of potassium chloride (KCl) and potassium nitrate ($KNO_3$) has a eutectic temperature (e.g., a minimum melting point) of 308° C. at a eutectic composition of approximately 90.5% $KNO_3$ when measured by moles, as shown in FIG. 7A at Point 715. Thus, a eutectic mixture of potassium nitrate ($KNO_3$) and potassium chloride (KCl) can be selected and prepared so as to have any melting point at least between 308° C. and 770° C., which includes temperatures suitable for glass treatment using potassium ion exchange, such as step 510 in FIG. 5.

FIG. 7B shows a phase diagram for a eutectic mixture of potassium nitrate ($KNO_3$) and potassium fluoride (KF). Pure potassium fluoride (KF) has a melting point of 858° C., as shown in FIG. 7B at Point 721. Pure potassium nitrate ($KNO_3$) has a melting point of 334° C., as shown at in FIG. 7B at Point 729. However, a eutectic mixture of potassium fluoride (KF) and potassium nitrate ($KNO_3$) has a eutectic temperature (e.g., a minimum melting point) of 307° C. at a eutectic composition of approximately 91.4% $KNO_3$ when measured by moles, as shown in FIG. 7B at Point 725. Thus, a eutectic mixture of potassium nitrate ($KNO_3$) and potassium fluoride (KF) can be selected and prepared so as to have any melting point at least between 307° C. and 858° C., which includes temperatures suitable for glass treatment using potassium ion exchange, such as step 510 in FIG. 5.

The multi-step ion exchange technique discussed with reference to FIGS. 5-7B may be used either in addition to or instead of the techniques discussed above with regard to FIGS. 1A-4E. Additionally or alternatively, the techniques discussed above with regard to FIGS. 1A-4E and/or FIGS. 5-7B may also be enhanced by modifying the pressure at which an ion exchange process is conducted.

For example, it may be desirable to increase ambient pressure to facilitate and/or accelerate an ion exchange process. High pressure may be particularly useful during lithium ion exchange, such as step 500 in FIG. 5, because high pressure will help speed up the ion exchange process as the glass shrinks because lithium is smaller than sodium. Increased pressure may also be useful when performing ion exchange at relatively low temperatures to increase an otherwise slow ion exchange process. By way of example, as discussed above, rubidium ion exchange occurs slowly at temperatures below about 450° C., and it therefore may be desirable to apply increased pressure.

As another example, it may be desirable to decrease ambient pressure to lower the melting point of salts. For example, as discussed above, halides of lithium, rubidium, and/or potassium typically have melting points above glass transition temperatures. However, lowering the ambient pressure can reduce the melting point of these halides, thereby allowing for their use in glass treatment. Decreased pressure can also be used in connection with eutectic mixtures which would otherwise have undesirably high melting points as an alternative to, or in addition to, altering the composition of the eutectic mixture (e.g., altering the relative proportions of constituent compounds within the eutectic mixture) to modify its melting point. Accordingly, one embodiment of the multi-step technique discussed above with reference to FIG. 5 may include applying a higher pressure during the lithium ion exchange in step 500, then applying a lower pressure during a potassium or rubidium ion exchange in step 510.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for use in preparing a glass, the method comprising:

performing a first ion exchange process to replace at least a first ion in the glass with at least a second ion, the second ion being smaller than the first ion; and performing a second ion exchange process to replace at least the second ion in the glass with at least a third ion, the third ion being larger than the first ion.

2. The method of claim 1, wherein each of the first ion, the second ion, and the third ion comprises a respective alkali metal.

3. The method of claim 1, wherein the first ion comprises sodium.

4. The method of claim 1, wherein the second ion comprises lithium.

5. The method of claim 4, wherein the first ion exchange process comprises treating the glass with at least a first lithium salt.

6. The method of claim 5, wherein the first ion exchange process comprises treating the glass with a eutectic mixture comprising at least the first lithium salt.

7. The method of claim 6, wherein the eutectic mixture comprises the first lithium salt and at least a second lithium salt.

8. The method of claim 1, wherein the third ion comprises potassium.

9. The method of claim 1, wherein the third ion comprises rubidium.

10. The method of claim 1, wherein the second ion exchange process is performed at a higher temperature than the first ion exchange process.

* * * * *